United States Patent [19]

Hendricks et al.

[11] Patent Number: 5,559,549
[45] Date of Patent: Sep. 24, 1996

[54] TELEVISION PROGRAM DELIVERY SYSTEM

[75] Inventors: John S. Hendricks, Potomac; Alfred E. Bonner, Bethesda, both of Md.

[73] Assignee: Discovery Communications, Inc., Bethesda, Md.

[21] Appl. No.: 160,191

[22] Filed: Dec. 2, 1993

Related U.S. Application Data

[63] Continuation-in-part of Ser. No. 991,074, Dec. 9, 1992.

[51] Int. Cl.$^6$ ........................................................ H04N 7/16
[52] U.S. Cl. .................................... 348/6; 348/12; 455/5.1
[58] Field of Search .................................. 348/6, 7, 9, 12, 348/13, 1; 455/4.2, 5.1, 6.1; H04N 7/16, 7/173

[56] References Cited

U.S. PATENT DOCUMENTS

| | | |
|---|---|---|
| D. 301,037 | 5/1929 | Matsuda . |
| D. 314,383 | 2/1991 | Hafner . |
| D. 325,581 | 4/1992 | Schwartz . |
| D. 329,238 | 9/1992 | Grasso et al. . |
| D. 331,760 | 12/1992 | Renk, Jr. . |
| 4,488,179 | 12/1984 | Kruger et al. . |
| 4,688,246 | 8/1987 | Eilers et al. . |
| 4,697,209 | 9/1987 | Keiwit et al. . |

(List continued on next page.)

FOREIGN PATENT DOCUMENTS

| | | |
|---|---|---|
| 2044574 | 12/1992 | Canada . |
| 243312 | 10/1987 | European Pat. Off. . |
| 355697 | 2/1990 | European Pat. Off. . |
| 424648 | 5/1991 | European Pat. Off. . |
| 506435 | 9/1992 | European Pat. Off. . |
| 61-060150 | 3/1986 | Japan . |
| 3198119 | 8/1991 | Japan . |

(List continued on next page.)

OTHER PUBLICATIONS

Hong Kong Enterprise advertisement: Two Innovative New Consumer Products From SVI; Nov. 1988; p. 379.
Great Presentations advertisement: Remote, Remote; 1987; p. 32H.
Consumer Dist. advertisement: Xpand Your TV's Channel Capability; Fall/Winter 1992; p. 215.
Henrie van den Boom: An Interactive Videotex System for Two-Way CATV Networks; AEU, Band 40; 1986; pp. 397–401.

(List continued on next page.)

*Primary Examiner*—Safet Metjahic
*Assistant Examiner*—Chris Grant
*Attorney, Agent, or Firm*—Dorsey & Whitney LLP

[57] ABSTRACT

An expanded television program delivery system is described which allows viewers to select television and audio program choices from a series of menus. The primary components of the system include an operations center, a digital cable headend, and at least one set top terminal having a remote control. The system allows for a great number of television signals to be transmitted by using digital compression techniques. A combined signal is transmitted over satellite to a cable headend, which may modify the combined signal for changes or additions in programming or menu content. The combined or modified signal is subsequently distributed to individual set top terminals in the cable network. Menus are partially stored in a set top terminal in each subscribers home and may be reprogrammed by signals sent from the operations center or headend. Numerous types of menus may be used, incorporating information included within the video/data signal received by the set top terminal. A remote control unit with icon buttons allows a subscriber to select programs based upon a series of major menus, submenus, and during program menus. Various data gathering and analysis techniques are used to compile programs watched information that in turn is used in packaging programs, customizing menu selections, targeting advertisements, and maintaining account and billing information.

21 Claims, 11 Drawing Sheets

U.S. PATENT DOCUMENTS

| | | |
|---|---|---|
| 4,706,121 | 11/1987 | Young . |
| 4,724,491 | 2/1988 | Lambert ................................. 358/310 |
| 4,792,972 | 12/1988 | Cook, Jr. . |
| 4,829,558 | 5/1989 | Welsh . |
| 4,829,569 | 5/1989 | Seth-Smith et al. .................. 380/10 |
| 4,860,379 | 8/1989 | Schoeneberger et al. . |
| 4,876,736 | 10/1989 | Kiewit . |
| 4,947,429 | 8/1990 | Bestler et al. . |
| 4,949,187 | 8/1990 | Cohen . |
| 4,949,810 | 9/1990 | Darbee et al. . |
| 4,961,109 | 10/1990 | Tanaka . |
| 4,975,951 | 12/1990 | Bennett . |
| 4,977,455 | 12/1990 | Young . |
| 4,995,078 | 2/1991 | Monslow et al. . |
| 5,001,554 | 3/1991 | Johnson et al. . |
| 5,015,829 | 5/1991 | Eilert et al. . |
| 5,020,129 | 5/1991 | Martin et al. . |
| 5,027,400 | 6/1991 | Baji et al. . |
| 5,036,394 | 7/1991 | Morii et al. . |
| 5,046,093 | 9/1991 | Wachob . |
| 5,047,867 | 9/1991 | Strubbe et al. . |
| 5,078,019 | 1/1992 | Aoki . |
| 5,093,718 | 3/1992 | Hoarty et al. . |
| 5,105,268 | 4/1992 | Yamanouchi et al. . |
| 5,132,789 | 7/1992 | Ammmon et al. . |
| 5,133,079 | 5/1989 | Ballantyne et al. . |
| 5,144,663 | 9/1992 | Kudelski et al. . |
| 5,151,782 | 9/1992 | Ferraro ................................. 348/7 |
| 5,151,789 | 9/1992 | Young . |
| 5,166,886 | 11/1992 | Molnar et al. . |
| 5,172,413 | 12/1992 | Bradley et al. ..................... 455/3.1 |
| 5,182,639 | 1/1993 | Jutamulia et al. . |
| 5,202,817 | 4/1993 | Koenck et al. . |
| 5,206,954 | 4/1993 | Inoue et al. ........................ 348/6 |
| 5,216,515 | 6/1993 | Steele et al. . |
| 5,223,924 | 6/1993 | Strubbe . |
| 5,227,211 | 8/1993 | Mailey et al. . |
| 5,247,347 | 9/1993 | Litteral et al. . |
| 5,253,066 | 10/1993 | Vogel . |
| 5,253,275 | 10/1993 | Yurt et al. ........................... 348/7 |
| 5,283,639 | 2/1994 | Esch et al. ........................... 348/6 |
| 5,289,271 | 2/1994 | Watson . |
| 5,293,540 | 3/1994 | Trani et al. . |
| 5,327,554 | 7/1994 | Palazzi et al. ..................... 348/13 |
| 5,339,315 | 8/1994 | Maeda et al. . |
| 5,343,239 | 8/1994 | Lappington et al. .............. 348/13 |
| 5,345,594 | 9/1994 | Tsuda ................................. 348/6 |
| 5,353,121 | 10/1994 | Young et al. . |
| 5,355,162 | 10/1994 | Yazolino et al. . |
| 5,357,276 | 10/1994 | Banker et al. . |
| 5,375,068 | 12/1994 | Palmer et al. ..................... 364/514 |
| 5,404,393 | 4/1995 | Remillard . |
| 5,410,326 | 4/1995 | Goldstein . |
| 5,414,426 | 5/1995 | O'Donnell et al. . |
| 5,416,508 | 5/1995 | Sakuma et al. . |
| 5,481,294 | 1/1996 | Thomas et al. . |

FOREIGN PATENT DOCUMENTS

| | | |
|---|---|---|
| 5250106 | 9/1993 | Japan . |
| 2168227 | 6/1986 | United Kingdom . |
| 8601962 | 3/1986 | WIPO . |
| 8909528 | 10/1989 | WIPO . |
| 9100670 | 1/1991 | WIPO . |
| 9103112 | 3/1991 | WIPO . |
| 9211713 | 7/1992 | WIPO . |
| 9212599 | 7/1992 | WIPO . |
| 9217027 | 10/1992 | WIPO . |
| 9221206 | 11/1992 | WIPO . |
| 9322877 | 11/1993 | WIPO . |

OTHER PUBLICATIONS

Daniel M. Moloney: Digital Compression in Todays Addressable Environment; 1993 NCTA Technical Papers; Jun. 6, 1993; pp. 308–316.

Caitlin Bestler: Flexible Data Structures and Interface Rituals For Rapid Development of OSD Applications; 93 NCTA Tech. Papers; Jun. 6, 1993; pp. 223–236.

A. D. Gelman, et al.: A Store–And–Forward Architecture For Video–On–Demand Service; ICC 91 Conf.; Jun. 1991; pp. 842–846.

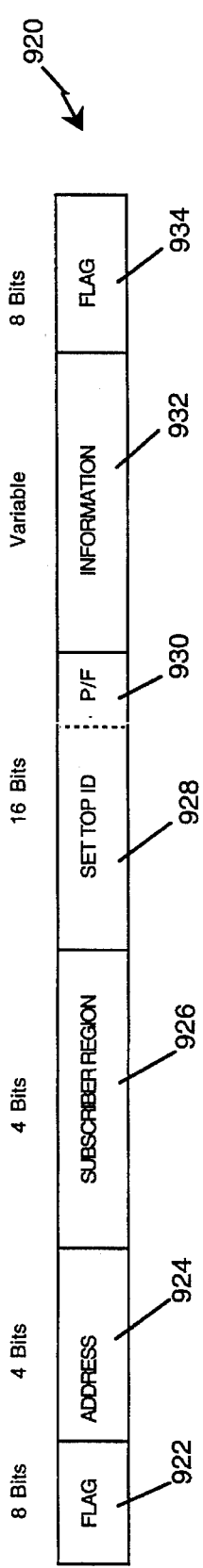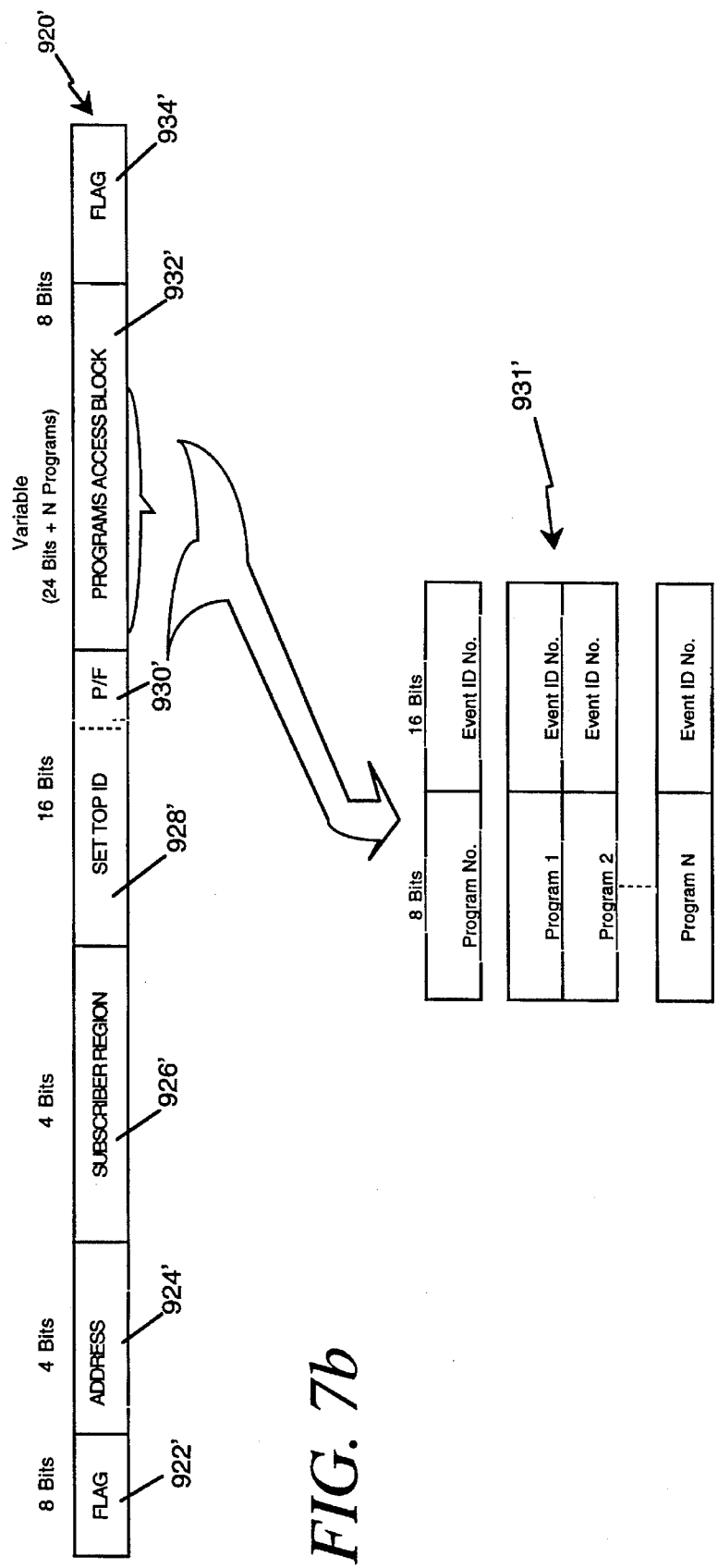
FIG. 7a
FIG. 7b

TELEVISION PROGRAM DELIVERY SYSTEM

RELATED APPLICATIONS

This application is a continuation-in-part of application Ser. No. 07/991,074 filed Dec. 9, 1992 entitled TELEVISION PROGRAM PACKAGING AND DELIVERY SYSTEM WITH MENU DRIVEN SUBSCRIBER ACCESS. The following other continuation-in-part applications, also based on the above-referenced patent application, are incorporated herein by reference:

Ser No. 08/160,281, entitled REPROGRAMMABLE TERMINAL FOR SUGGESTING PROGRAMS OFFERED ON A TELEVISION PROGRAM DELIVERY SYSTEM, filed Dec. 2, 1993.

Ser. No. 08/160,280, entitled NETWORK CONTROLLER FOR CABLE TELEVISION DELIVERY SYSTEMS, filed Dec. 2, 1993.

Ser. No. 08/160,282, entitled AN OPERATIONS CENTER FOR A TELEVISION PROGRAM PACKAGING AND DELIVERY SYSTEM, filed Dec. 2, 1993.

Ser. No. 08/160,193, entitled SET-TOP TERMINAL FOR CABLE TELEVISION DELIVERY SYSTEMS, filed Dec. 2, 1993.

Ser. No. 08/160,194, entitled ADVANCED SET-TOP TERMINAL FOR CABLE TELEVISION DELIVERY SYSTEMS, filed Dec. 2, 1993.

Ser. No. 08/160,283, entitled DIGITAL CABLE HEADEND FOR CABLE TELEVISION DELIVERY SYSTEM, filed Dec. 2, 1993.

BACKGROUND OF THE INVENTION

The invention relates to television entertainment systems for providing television programming to consumer homes. More particularly, the invention relates to a user friendly system for providing consumers with television programming choices.

Advances in television entertainment have been primarily driven by breakthroughs in technology. In 1939, advances on Vladmir Zworykin's picture tube provided the stimulus for NBC to begin its first regular broadcasts. In 1975, advances in satellite technology provided consumers with increased programming to homes.

Many of these technology breakthroughs have produced inconvenient systems for consumers. One example is the ubiquitous three remote control home, having a separate and unique remote control for the TV, cable box and VCR. More recently, technology has provided cable users in certain parts of the country with 100 channels of programming. This increased program capacity is beyond the ability of many consumers to use effectively. No method of managing the program choices has been provided to consumers.

Consumers are demanding that future advances in television entertainment, particularly programs and program choices, be presented to the consumer in a user friendly manner. Consumer preferences, instead of technological breakthroughs, will drive the television entertainment market for at least the next 20 years. As computer vendors have experienced a switch from marketing new technology in computer hardware to marketing better useability, interfaces and service, the television entertainment industry will also experience a switch from new technology driving the market to consumer useability driving the market.

Consumers want products incorporating new technology that are useful, and will no longer purchase new technology for the sake of novelty or status. Technological advances in sophisticated hardware are beginning to surpass the capability of the average consumer to use the new technology. Careful engineering must be done to make entertainment products incorporating new technology useful and desired by consumers.

In order for new television entertainment products to be successful, the products must satisfy consumer demands. TV consumers wish to go from limited viewing choices to a variety of choices, from no control of programming to complete control. Consumers wish to advance from cumbersome and inconvenient television to easy and convenient television and keep costs down. Consumers do not wish to pay for one hundred channels when due to lack of programming information, they seldom, if ever, watch programming on many of these channels.

The concepts of interactive television, high definition television and 300 channel cable systems in consumer homes will not sell if they are not packaged, delivered and presented in a useable fashion to consumers. The problem is that TV programming is not being presented to consumers in a user friendly manner.

Consumers are already being bombarded with programming options, numerous "free" cable channels, subscription cable channels and pay-per-view choices. Any further increase in TV entertainment choices, without a user friendly presentation and approach, will likely bewilder viewers with a mind-numbing array of choices.

What is needed is an economical system which can present television programs through a user friendly interface which allows the consumer to easily select from among the many program choices.

What is needed is a system capable of handling hundreds of programs in different formats, be expandable for future types of programming and be inexpensive.

What is need is a system for organizing programming to be offered to viewers.

What is needed is a television program delivery system that can be operated in a distributive fashion and controlled from one or more national centers.

What is needed is a television program delivery system that operates in the digital audio/video environment.

What is needed is a system capable of packaging hundreds of television programs for delivery to subscribers.

What is needed is a system that analyzes data on programs watched by viewers.

What is needed is a system capable of monitoring account and billing information for hundreds of program offerings.

What is needed is a system that assists the consumer with program selection.

What is needed is a system that provides subscribers with menu-driven access to hundreds of television programs.

What is needed is a system that accommodates digital decompression and digital signaling capabilities.

The present invention is addressed to fulfill these needs.

SUMMARY OF INVENTION

This invention is a digital television program delivery system. Specifically, the present invention is a digital television program delivery system that provides subscribers with menu-driven access to an expanded television program package.

The invention makes use of developments in digital compression signaling that allows much greater throughput of television program signals over existing transmission media. These developments allow subscribers to use the present invention to exploit a four-fold or more increase in current program delivery capability. In particular, the present invention provides subscribers with a menu-driven access scheme to an expanded television program lineup, enabling subscribers to access and view selected programs using a user friendly interface.

This interface includes a remote control and a series of menus that may be sequenced by the subscriber using simple alpha, numeric and iconic character access keys, or by moving a cursor or highlight bar on the television screen. In this way, subscribers can advance from one menu to the next with the press of a single button. Different television programs, grouped by category, may be selected and accessed from each menu. As a result, the present invention provides subscribers with a convenient method of choosing a program for viewing from hundreds of program offerings.

The present invention uses several basic system components, namely: (i) at least one operations center, where the television programs are packaged and control information is created and then assembled in the form of digital data, (ii) a digital compression system, where the television programming signals and digital data may be compressed and processed for digital transmission over satellite to a cable headend for subsequent distribution over a cable network, and (iii) a set of in-home decompressors or set top terminals, which provide subscribers with digital decompression, digital signaling and menu generation capabilities. Each of these basic system components plays an important role in the system's overall operation.

The operations center includes a computer assisted packaging system (CAP), which makes use of the necessary hardware and software to control and transmit programming signals over a television delivery system. The CAP creates the program lineup or packaging of programs and the packaging of menu and control information for later transmission and use at the cable headend. Transmission of control information enables the operations center to change allocation of programs across physical channels, update menu information, reprogram menu formats and menu flow, and change or augment a packaged program signal sent to a particular region of the country.

Once the programming signals have been packaged, compressed and processed for digital transmission, these signals are sent along with the control information to the cable headend. Each cable headend typically includes signal processing hardware and software capable of receiving, repackaging/combining and routing program signals to the subscriber homes.

Each cable headend in the television delivery system also includes a network controller that manages the configuration of the set top terminals and processes signals received from the set top terminals, gathering programs watched data. The network controller modifies the control information to accommodate changes and additions in programming and advertisements, working with the signal processing hardware and software to distribute programs to the subscribers. The network controller also monitors all data received from the set top terminals in the cable network. The network controller uses data received to target advertisements to particular subscribers as well as to maintain account and billing information.

From the cable headend, the programming signals and program control information are transmitted to the subscriber locations. Each subscriber is equipped with a set top terminal having various digital decompression, menu generation, upstream data transmissions, remote reprogramming and other advanced functional capabilities, or some combination thereof. With such capabilities, the set top terminal supports, for example, interactive communications with the cable headend. The set top terminal includes an interface that allows a subscriber to select and decompress a digitally compressed program signal for display on a television through sequencing menus on the television screen. The menus may be generated from menu templates stored in each set top terminal, with each selectable menu option corresponding to either another menu or a particular television program.

It is an object of the invention to provide a user friendly interface for subscribers to access television programs.

It is an object of this invention to provide an economical system which can present television programs through a user friendly interface which allows the consumer to easily select from among the many program choices.

It is an object of this invention to provide a system capable of handling hundreds of programs in different formats, be expandable for future types of programming and be inexpensive.

It is an object of this invention to provide a system for organizing programming to be offered to viewers.

It is an object of this invention to provide a television program delivery system that can be operated in a distributive fashion and controlled from one or more national centers.

It is an object of this invention to provide a television program delivery system that operates in the digital audio/video environment.

It is an object of this invention to provide a system capable of packaging hundreds of television programs for delivery to subscribers.

It is an object of this invention to provide a system that analyzes data on programs watched by viewers.

It is an object of this invention to provide a system capable of monitoring account and billing information for hundreds of program offerings.

It is an object of this invention to provide a system that assists the consumer with program selection.

It is an object of this invention to provide a system that provides subscribers with menu-driven access to hundreds of television programs.

It is an object of this invention to provide a system that accommodates digital decompression and digital signaling capabilities.

These and other objects and advantages of the invention will become obvious to those skilled in the art upon review of the following description, the attached drawings and appended claims.

DESCRIPTION OF THE DRAWINGS

FIG. 7a is a drawing of a frame format for a program control information signal.

FIG. 7b is a drawing of a frame format for a polling response from the set top terminal.

DETAILED DESCRIPTION OF THE PREFERRED EMBODIMENT

Television Program Delivery System Description

1. Introduction

Figure 1:
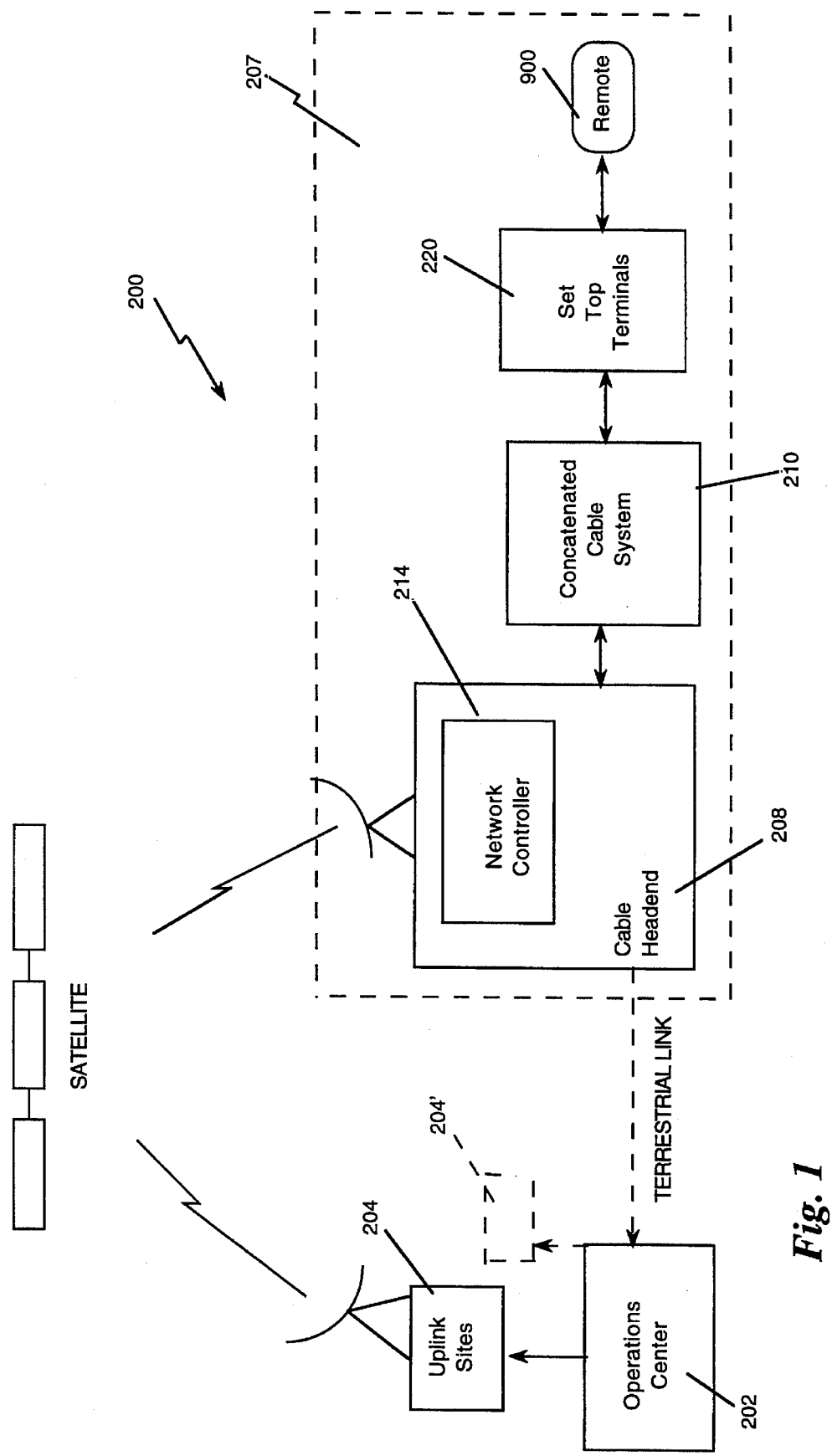
FIG. 1 is a diagram of the primary components of the television delivery system.

FIG. 1 shows the present invention as an expanded cable television program delivery system 200 that dramatically increases programming capacity using compressed transmission of television program signals. Developments in digital bandwidth compression technology now allow much greater throughput of television program signals over existing or slightly modified transmission media. The program delivery system 200 shown provides subscribers with a user friendly interface to operate and exploit a six-fold or more increase in current program delivery capability.

Subscribers are able to access an expanded television program package and view selected programs through a menu-driven access scheme that allows each subscriber to select individual programs by sequencing a series of menus. The menus are sequenced by the subscriber using simple alpha-numeric and iconic character access or moving a cursor or highlight bar on the TV screen to access desired programs by simply pressing a single button, rather than recalling from memory and pressing the actual two or more digit numeric number assigned to a selection. Thus, with the press of a single button, the subscriber can advance from one menu to the next. In this fashion, the subscriber can sequence the menus and select a program from any given menu. The programs are grouped by category so that similar program offerings are found on the same menu.

2. Major System Components

In its most basic form, the system uses a program delivery system 200 in conjunction with a conventional concatenated cable television system 210. The program delivery system 200 generally includes (i) at least one operations center 202, where program packaging and control information are created and then assembled in the form of digital data, (ii) a digital compression system, where the digital data is compressed, combined/multiplexed, encoded, and mapped into digital signals for satellite transmission to the cable headend 208, and (iii) a set of in-home decompressors. The program delivery system 200 transports the digital signals to the cable headend 208 where the signals are transmitted through a concatenated cable television system 210. Within the cable headend 208, the received signals may be decoded, demultiplexed, managed by a local central distribution and switching mechanism, combined and then transmitted to the set top terminal 220 located in each subscriber's home over the cable system 210. Although concatenated cable systems 210 are the most prevalent transmission media to the home, telephone lines, cellular networks, fiberoptics, Personal Communication Networks and similar technology for transmitting to the home can be used interchangeably with this program delivery system 200.

The delivery system 200 has a reception region 207 with an in-home decompression capability. This capability is performed by a decompressor housed within a set top terminal 220 in each subscriber's home. The decompressor remains transparent from the subscriber's point of view and allows any of the compressed signals to be demultiplexed and individually extracted from the composite data stream and then individually decompressed upon selection by the subscriber. The decompressed video signals are converted into analog signals for television display. Such analog signals include NTSC formatted signals for use by a standard television. Control signals are likewise extracted and decompressed and then either executed immediately or placed in local storage such as a RAM. Multiple sets of decompression hardware may be used to decompress video and control signals. The set top terminal 220 may then overlay or combine different signals to form the desired display on the subscriber's television. Graphics on video or picture-on-picture are examples of such a display.

Although a single digital compression standard (e.g., MPEG) may be used for both the program delivery system 200 and the concatenated cable system 210, the compression technique used may differ between the two systems. When the compression standards differ between the two media, the signals received by the cable headend 208 must be decompressed before transmission from the headend 208 to the set top terminals 220. Subsequently, the cable headend 208 must recompress and transmit the signals to the set top terminal 220, which would then decompress the signals using a specific decompression algorithm.

The video signals and program control signals received by the set top terminal 220 correspond to specific television programs and menu selections that each subscriber may access through a subscriber interface. The subscriber interface is a device with buttons located on the set top terminal 220 or on a portable remote control 900. In the preferred system embodiment, the subscriber interface is a combined alpha-character, numeric and iconic remote control device 900, which provides direct or menu-driven program access. The preferred subscriber interface also contains cursor movement and go buttons as well as alpha, numeric and iconic buttons. This subscriber interface and menu arrangement enables the subscriber to sequence through menus by choosing from among several menu options that are displayed on the television screen. In addition, a user may bypass several menu screens and immediately choose a program by selecting the appropriate alpha-character, numeric or iconic combinations on the subscriber interface. In the preferred embodiment, the set top terminal 220 generates the menus that are displayed on the television by creating arrays of particular menu templates, and the set top terminal 220 displays a specific menu or submenu option for each available video signal.

3. Operation Center and Digital Compression System

Figure 2:
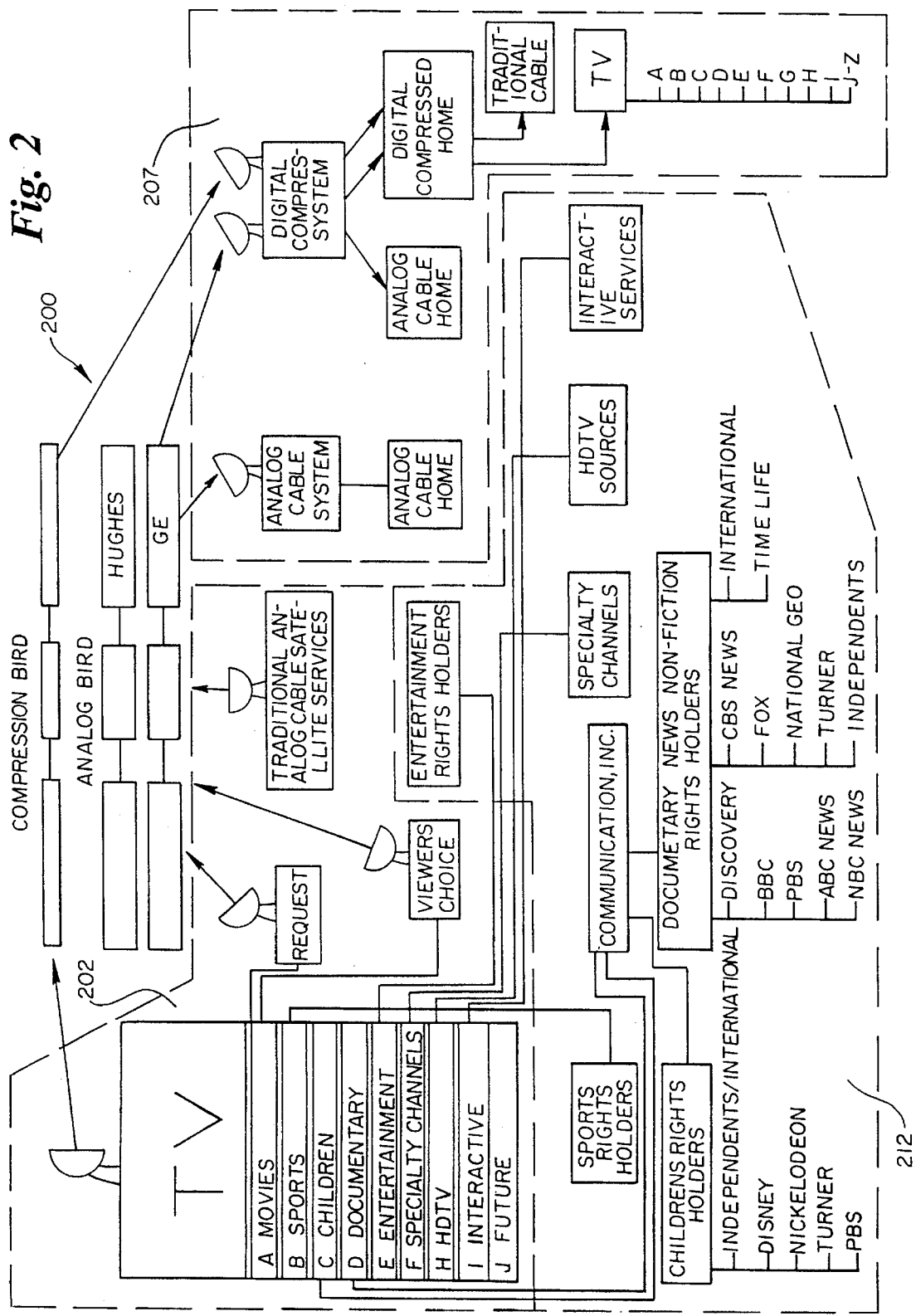
FIG. 2 is an overview of the television delivery system operations.

The operations center 202 performs two primary services, packaging television programs and generating the program control information signal. At the operations center 202, television programs are received from external program sources in both analog and digital form. FIG. 2 shows an embodiment of the operations center receiving signals from various external sources 212. Examples of the external program sources are sporting events, children's programs, specialty channels, news or any other program source that can provide audio or visual signals. Once the programs are received from the external program sources, the operations center 202 digitizes (and preferably compresses) any program signals received in analog form. The operations center 202 may also maintain an internal storage of programs. The internally stored programs may be in analog or digital form and stored on permanent or volatile memory sources, including magnetic tape or RAM. Subsequent to receiving programming, the operations center 202 packages the programs into the groups and categories which provide the optimal marketing of the programs to subscribers. For example, the operations center 202 may package the same programs into different categories and menus for weekday, prime-time viewing and Saturday afternoon viewing. Also, the operations center 202 packages the television programs in a manner that enables both the various menus to easily represent the programs and the subscribers to easily access the programs through the menus.

The packaging of the digital signals is typically performed at the operations center 202 by computer assisted packaging equipment (CAP). The CAP system normally includes at least one computer monitor, keyboard, mouse, and standard video editing equipment. A programmer packages the signals by entering certain information into the CAP. This information includes the date, time slot, and program category of the various programs. The programmer and the CAP utilize demographic data and ratings in performing the packaging tasks. After the programmer selects the various programs from a pool of available programs and inputs the requisite information, the programmer, with assistance from the CAP, can select the price and allocate transponder space for the various programs. After the process is complete, the CAP displays draft menus or program schedules that correspond to the entries of the programmer. The CAP may also graphically display allocation of transponder space. The programmer may edit the menus and transponder allocation several times until satisfied with the programming schedule. During the editing, the programmer may direct the exact location of any program name on a menu with simple commands to the CAP.

The packaging process also accounts for any groupings by satellite transponder which are necessary. The operations center 202 may send different groups of programs to different cable headends 208 and/or set top terminals 220. One way the operations center 202 may accomplish this task is to send different program packages to each transponder. Each transponder, or set of transponders, then relays a specific program package to specific cable headends 208 and/or set top terminals 220. The allocation of transponder space is an important task performed by the operations center 202.

The operations center 202 may also "insert" directions for filling local available program time in the packaged signal to enable local cable and television companies to fill the program time with local advertising and/or local programming. Consequently, the local cable headends 208 are not constrained to show only programs transmitted from the operations center 202. New set top converters will incorporate both digital and analog channels. Therefore, the cable headend 208 may combine analog signals with the digital signals prior to transmitting the program signals to the set top terminals 220.

After the CAP packages the programs, it creates a program control information signal to be delivered with the program package to the cable headend 208 and/or set top terminal 220. The program control information signal contains a description of the contents of the program package, commands to be sent to the cable headend 208 and/or set top terminal 220, and other information relevant to the signal transmission.

In addition to packaging the signal, the operations center 202 employs digital compression techniques to increase existing satellite transponder capacity by at least a 4:1 ratio, resulting in a four-fold increase in program delivery capability. A number of digital compression algorithms currently exist which can achieve the resultant increase in capacity and improved signal quality desired for the system. The algorithms generally use one or more of three basic digital compression techniques: (1) within-frame (intraframe) compression, (2) flame-to-frame (interframe) compression, and (3) within carrier compression. Specifically, in the preferred embodiment, the MPEG 2 compression method is used. After digital compression, the signals are combined (multiplexed) and encoded. The combined signal is subsequently transmitted to various uplink sites 204.

There may be a single uplink site 204 or multiple uplink sites (represented by 204', shown in phantom in FIG. 1) for each operation center 202. The uplink sites 204 may either be located in the same geographical place or may be located remotely from the operations center 202. Once the composite signal is transmitted to the uplink sites 204, the signal may be multiplexed with other signals, modulated, upconverted and amplified for transmission over satellite. Multiple cable headends 208 may receive such transmissions.

In addition to multiple uplinks, the delivery system 200 may also contain multiple operations centers. The preferred method for using multiple operations centers is to designate one of the operations centers as a master operations center and to designate the remaining operations centers as slave operations centers. In this configuration, the master operations center coordinates various functions among the slave operations centers such as synchronization of simultaneous transmissions and distributes the operations workload efficiently.

4. Cable Headend

After the operations center 202 has compressed and encoded the program signals and transmitted the signals to the satellite, the cable headend 208 receives and further processes the signals before they are relayed to each set top terminal 220. Each cable headend site is generally equipped with multiple satellite receiver dishes. Each dish is capable of handling multiple transponder signals from a single satellite and sometimes from multiple satellites.

As an intermediary between the set top terminals 220 and the operations center 202 (or other remote site), the cable headend 208 performs two primary functions. First, the cable headend 208 acts as a distribution center, or signal processor, by relaying the program signal to the set top terminal 220 in each subscriber's home. In addition, the cable headend 208 acts as a network controller 214 by receiving information from each set top terminal 220 and passing such information on to an information gathering site such as the operations center 202.

Figure 3:
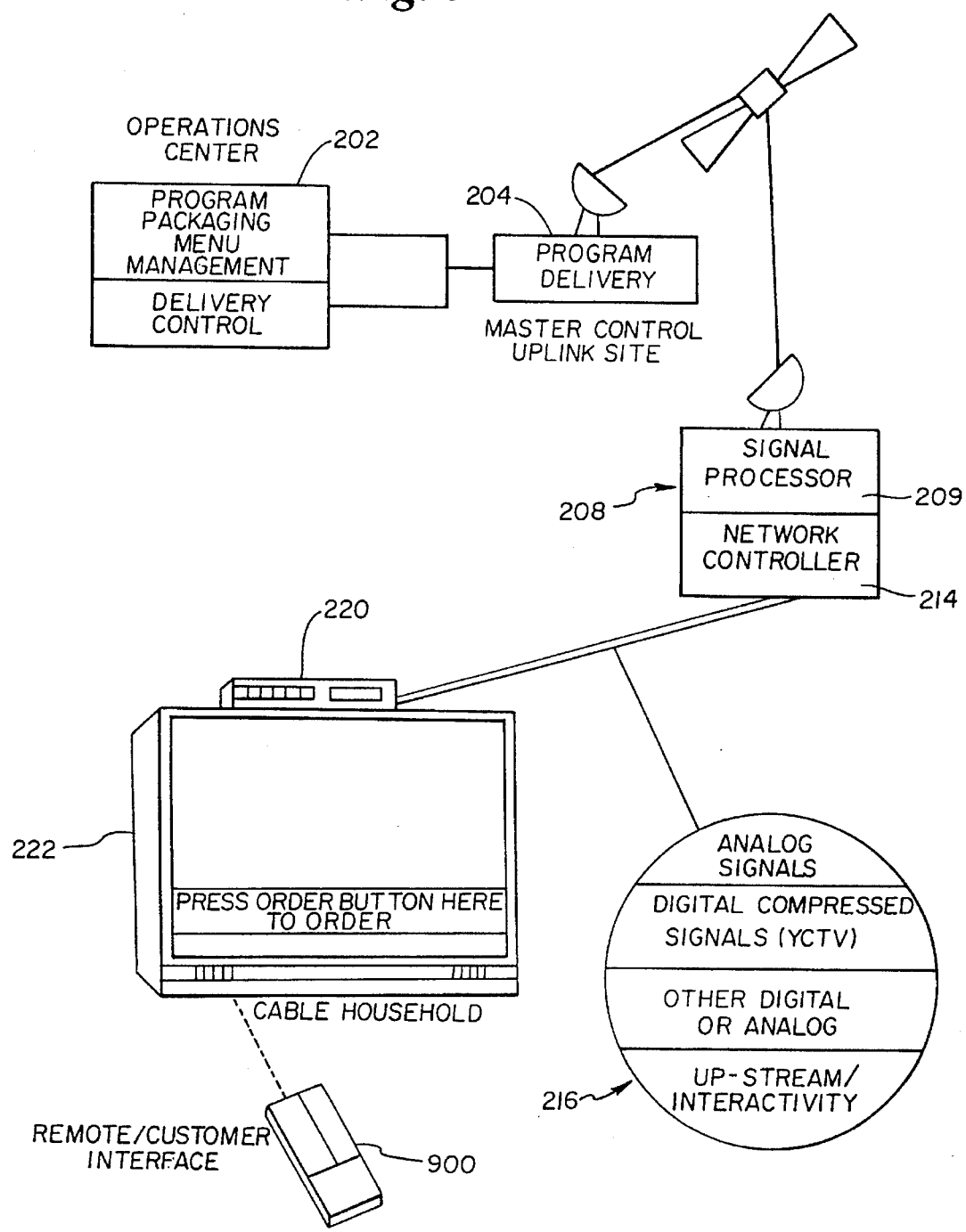
FIG. 3 is a schematic of the operation of the primary components of the system.

FIG. 3 shows an embodiment where the cable headend 208 and the subscriber's home are linked by certain communications media 216. In this particular embodiment, analog signals, digitally compressed signals, other digital signals and up-stream/interactivity signals are sent and received over the media 216. The cable headend 208 provides such signaling capabilities in its dual roles as a signal processor 209 and network controller 214.

As a signal processor 209, the cable headend 208 prepares the program signals that are received by the cable headend 208 for transmission to each set top terminal 220. In the preferred system, the signal processor 209 re-routes or demultiplexes and recombines the signals and digital information received from the operations center 202 and allocates different portions of the signal to different frequency ranges. Cable headends 208 which offer different subscribers different program offerings may allocate the program signals from the operations center 202 in various manners to accommodate different viewers. The signal processor 209 may also incorporate local programming and/or local advertisements into the program signal and forward the revised signal to the set top terminals 220. To accommodate this local programming availability, the signal processor 209 must combine the local signal in digital or analog form with the operations center program signals. If the local cable system uses a compression standard that is different than the one used by the operations center 202, the signal processor 209 must also decompress and recompress incoming signals so they may be properly formatted for transmission to the set top terminals 220. This process becomes less important as standards develop (i.e., MPEG 2). In addition, the signal processor 209 performs any necessary signal decryption and/or encryption.

As a network controller 214, the cable headend 208 performs the system control functions for the system. The primary function of the network controller 214 is to manage the configuration of the set top terminals 220 and process signals received from the set top terminals 220. In the preferred embodiment, the network controller 214 monitors, among other things, automatic poll-back responses from the set top terminals 220 remotely located at each subscribers' home. The polling and automatic report-back cycle occurs frequently enough to allow the network controller 214 to maintain accurate account and billing information as well as monitor authorized channel access. In the simplest embodiment, information to be sent to the network controller 214 will be stored in RAM within each subscriber's set top terminal 220 and will be retrieved only upon polling by the network controller 214. Retrieval may, for example, occur on a daily, weekly or monthly basis. The network controller 214 allows the system to maintain complete information on all programs watched using a particular set top terminal 220.

The network controller 214 is also able to respond to the immediate needs of a set top terminal 220 by modifying a program control information signal received from the operations center 202. Therefore, the network controller 214 enables the delivery system to adapt to the specific requirements of individual set top terminals 220 when the requirements cannot be provided to the operations center 202 in advance. In other words, the network controller 214 is able to perform "on the fly programming" changes. With this capability, the network controller 214 can handle sophisticated local programming needs such as, for example, interactive television services, split screen video, and selection of different foreign languages for the same video. In addition, the network controller 214 controls and monitors all compressors and decompressors in the system.

The delivery system 200 and digital compression of the preferred embodiment provides a one-way path from the operations center 202 to the cable headend 208. Status and billing information is sent from the set top terminal 220 to the network controller 214 at the cable headend 208 and not directly to the operations center 202. Thus, program monitoring and selection control will take place only at the cable headend 208 by the local cable company and its decentralized network controllers 214 (i.e., decentralized relative to the operations center 202, which is central to the program delivery system 200). The local cable company will in turn be in communication with the operations center 202 or a regional control center (not shown) which accumulates return data from the set top terminal 220 for statistical or billing purposes. In alternative system embodiments, the operations center 202 and the statistical and billing sites are collocated. Further, telephone lines with modems are used to transfer information from the set top terminal 220 to the statistical and billing sites.

5. Set Top Terminal

The set top terminal 220 is the portion of the delivery system 200 that resides in the home of a subscriber. The set top terminal 220 is usually located above or below the subscriber's television, but it may be placed anywhere in or near the subscriber's home as long as it is within the range of the subscriber's remote control device 900. In some aspects, the set top terminal 220 may resemble converter boxes already used by many cable systems. For instance, each set top terminal 220 may include a variety of error detection, decryption, and coding techniques such as antitaping encoding. However, it will become apparent from the discussion below that the set top terminal 220 is able to perform many functions that an ordinary converter box cannot perform.

The set top terminal 220 has a plurality of input and output ports to enable it to communicate with other local and remote devices. The set top terminal 220 has an input port that receives information from the cable headend 208. In addition, the unit has at least two output ports which provide communications from the set top terminal 220 to a television and a VCR. Certain menu selections may cause the set top terminal 220 to send control signals directly to the VCR to automatically program or operate the VCR. Also, the set top terminal 220 contains a phone Jack which can be used for maintenance, trouble shooting, reprogramming and additional customer features. The set top terminal 220 may also contain stereo/audio output terminals and a satellite dish input port.

Functionally, the set top terminal 220 is the last component in the delivery system chain. The set top terminal 220 receives compressed program and control signals from the cable headend 208 (or, in some cases, directly from the operations center 202). After the set top terminal 220 receives the individually compressed program and control signals, the signals are demultiplexed, decompressed, converted to analog signals (if necessary) and either placed in local storage (from which the menu template may be created), executed immediately, or sent directly to the television screen.

After processing certain signals received from the cable headend 208, the set top terminal 220 is able to store menu templates for creating menus that are displayed on a subscriber's television by using an array of menu templates. Before a menu can be constructed, menu templates must be created and sent to the set top terminal 220 for storage. A microprocessor uses the control signals received from the operations center 202 or cable headend 208 to generate the menu templates for storage. Each menu template may be stored in volatile memory in the set top terminal 220. When the set top terminal receives template information it demultiplexes the program control signals received from the cable headend 208 into four primary parts: video, graphics, program logic and text. Each menu template represents a different portion of a whole menu, such as a menu background, television logo, cursor highlight overlay, or other miscellaneous components needed to build a menu. The menu templates may be deleted or altered using control signals received from the operations center 202 or cable headend 208.

Once the menu templates have been stored in memory, the set top terminal 220 can generate the appropriate menus. In the preferred embodiment, the basic menu format information is stored in memory located within the set top terminal 220 so that the microprocessor may locally access the information from the set top terminal instead of from an incoming signal. The microprocessor next generates the appropriate menus from the menu templates and the other menu information stored in memory. The set top terminal 220 then displays specific menus on the subscriber's television screen that correspond to the inputs the subscriber selects.

If the subscriber selects a specific program from a menu, the set top terminal 220 determines on which channel the program is being shown, demultiplexes and extracts the single channel transmitted from the cable headend 208. The set top terminal 220 then decompresses the channel and, if necessary, converts the program signal to an analog NTSC signal to enable the subscriber to view the selected program. The set top terminal 220 can be equipped to decompress more than one program signal, but this would unnecessarily add to the cost of the unit since a subscriber will generally only view one program at a time. However, two or three decompressors may be desirable to provide picture-on-picture capability, control signal decompression, enhanced channel switching or like features.

In addition to menu information, the set top terminal 220 may also store text transmitted from the cable headend 208 or the operations center 202. The text may inform the subscriber about upcoming events, billing and account status, new subscriptions, or other relevant information. The text will be stored in an appropriate memory location depending on the frequency and the duration of the use of the textual message.

Also, optional upgrades are available to enhance the performance of a subscriber's set top terminal 220. These upgrades may consist of a cartridge or computer card (not shown) that is inserted into an expansion slot in the set top terminal 220 or may consist of a feature offered by the cable headend 208 or operations center 202 to which the user may subscribe. Available upgrades may include on line data base services, interactive multi-media services, access to digital radio channels, and other services.

In the simplest embodiment, available converter boxes such as those manufactured by General Instruments or Scientific Atlanta, may be modified and upgraded to perform the functions of a set top terminal 220. The preferred upgrade is a circuit card with a microprocessor which is electronically connected to or inserted into the converter box.

6. Remote Control Device

The primary conduit for communication between the subscriber and the set top terminal 220 is through the subscriber interface, preferably a remote control device 900. Through this interface, the subscriber may select desired programming through the system's menu-driven scheme or by directly accessing a specific channel by entering the actual channel number. Using the interface, the subscriber can navigate through a series of informative program selection menus. By using menu-driven, iconic or alpha-character access, the subscriber can access desired programs by simply pressing a single button rather than recalling from memory and pressing the actual channel number to make a selection. The subscriber can access regular broadcast and basic cable television stations by using either the numeric keys on the remote control 900 (pressing the corresponding channel number), or one of the menu icon selection options.

In addition to enabling the subscriber to easily interact with the cable system 200, the physical characteristics of the subscriber interface 900 should also add to the user friendliness of the system. The remote control 900 should easily fit in the palm of the user's hand. The buttons of the preferred remote control 900 contain pictorial symbols that are easily identifiable by the subscriber. Also, buttons that perform similar functions may be color coordinated and consist of distinguishing textures to increase the user friendliness of the system.

7. Menu-Driven Program Selection

The menu-driven scheme provides the subscriber with one-step access to all major menus, ranging from hit movies to sport specials to specialty programs. From any of the major menus, the subscriber can in turn access submenus and minor menus by cursor or alpha-character access.

There are two different types of menus utilized by the preferred embodiment, the Program Selection menus and the During Program menus. The first series of menus, Program Selection menus, consists of an Introductory, a Home, Major menus, and Submenus. The second series of menus, During Program menus, consists of two primary types, Hidden menus and the Program Overlay menus.

Immediately after the subscriber turns on the set top terminal 220, the Introductory menu welcomes the subscriber to the system. The Introductory menu may display important announcements from the local cable franchise, advertisements from the cable provider, or other types of messages. In addition, the Introductory menu can inform the subscriber if the cable headend 208 has sent a personal message to the subscriber's particular set top terminal 220.

After the Introductory menu has been displayed the subscriber may advance to the next level of menus, namely the Home menu. In the preferred embodiment, after a certain period of time, the cable system will advance the subscriber by default to the Home menu. From the Home menu, the subscriber is able to access all of the programming options. The subscriber may either select a program directly by entering the appropriate channel number from the remote control 900, or the subscriber may sequence through incremental levels of menu options starting from the Home menu. The Home menu lists categories that correspond to the first level of menus called Major menus.

If the subscriber chooses to sequence through subsequent menus, the subscriber will be forwarded to the Major menu that corresponds to the chosen category from the Home menu. The Major menus further refine a subscriber's search and help guide the subscriber to the selection of his choice.

From the Major menus, the subscriber may access several submenus. From each submenu, the subscriber may access other submenus until the subscriber finds a desired television program. Similar to the Major menu, each successive level of Submenus further refines the subscriber's search. The system also enables the subscriber to skip certain menus or submenus and directly access a specific menu or television program by entering the appropriate commands on the remote control 900.

The During program menus (including Hidden Menus and Program Overlay Menus) are displayed by the set top terminal 220 only after the subscriber has selected a television program. In order to avoid disturbing the subscriber, the set top terminal 220 does not display the Hidden Menus until the subscriber selects the appropriate option to display a Hidden Menu. The Hidden Menus contain options that are relevant to the program selected by the viewer. For example, a Hidden Menu may contain options that enable a subscriber to enter an interactive mode or escape from the selected program.

Program Overlay Menus are similar to Hidden Menus because they occur during a program and are related to the program being viewed. However, the Program Overlay Menus are displayed concurrently with the program selected by the subscriber. Most Program Overlay Menus are small enough on the screen to allow the subscriber to continue viewing the selected program comfortably.

B. Detailed Set Top Terminal Description

The set top terminal 220 receives and manipulates signals from the cable headend 208. The set top terminal 220 is equipped with local computer memory and the capability of interpreting the digitally compressed signal to produce menus for the subscriber. The remote control 900 communicates the subscriber's selections to the set top terminal 220. The subscriber's selections are generally based upon menus or other prompts displayed on the television screen.

It is preferred that the signal reaches the subscriber's home in a compressed format and is decompressed prior to viewing. Included in the delivered program signal is information that enables equipment at the subscriber's home to display menus for choosing particular programs. Depending on the particular embodiment, the television program signal may arrive at the subscriber's home through one or more connections such as coaxial cables, fiber cables, twisted pairs, cellular telephone connections, or personal communications network (PCN) hookups.

The program control information signal is generated by the operations center 202 and provides the network controller 214 with data on the scheduling and description of programs. In an alternate configuration, this data is sent directly to the set top terminal 220 for display to the subscriber. In the preferred embodiment, the program control information signal is stored and modified by the network controller 214 and sent to the set top terminal 220 in the form of a set top terminal control information stream (STTCIS). The set top terminal 220 integrates either the program control information signal or the STTCIS with data stored in the memory of the set top terminal 220 to generate on-screen menus that assist the subscriber in choosing programs for display.

The types of information that can be sent using the program control signal include: number of program categories, names of program categories, what channels are assigned to a specific category (such as specialty channels), names of channels, names of programs on each channel, program start times, length of programs, description of programs, menu assignment for each program, pricing, whether there is a sample video clip for advertisement for the program, and any other program, menu or product information.

With a minimal amount of information being communicated to the set top terminal 220 on a regular basis, the set top terminal 220 is able to determine the proper menu location for each program and the proper time and channel to activate for the subscriber after a menu selection. The program control information signal and STTCIS can be formatted in a variety of ways and the on-screen menus can be produced using many different methods. For instance, if the program control information signal carries no menu format information, the menu format for creating the menus can be fixed in ROM at the set top terminal 220. In the preferred embodiment, the menu format information is stored at the set top terminal 220 in a temporary memory device such as a RAM or EPROM. New menu format information is sent via the program control information signal or the STTCIS to the set top terminals 200 whenever a change to a menu format is desired.

In the simplest embodiment, the menu formats remain fixed and only the text changes. In this way the program control information signal can be limited to primarily text and a text generator can be employed in the set top terminal 220. Another simple embodiment uses a separate channel full-time (large bandwidth) Just for the menu information.

Live video signals may be used in windows of certain menus. These video signals can be transmitted using the program control information signal or STTCIS, or can be taken off channels being transmitted simultaneously with the menu display. Video for menus, promos or demos may be sent to the set top terminal 220 in several formats, including (1) on a dedicated channel, (2) on a regular program channel and scaled to size, or (3) along with the program control information signal. However, in the preferred embodiment, a large number of short promos or demo video is sent using a split screen technique on a dedicated channel. A multiple window technique may be used with the menus to display a description of a program and one or more video frames that assist the subscriber in selecting the program.

Figure 4:
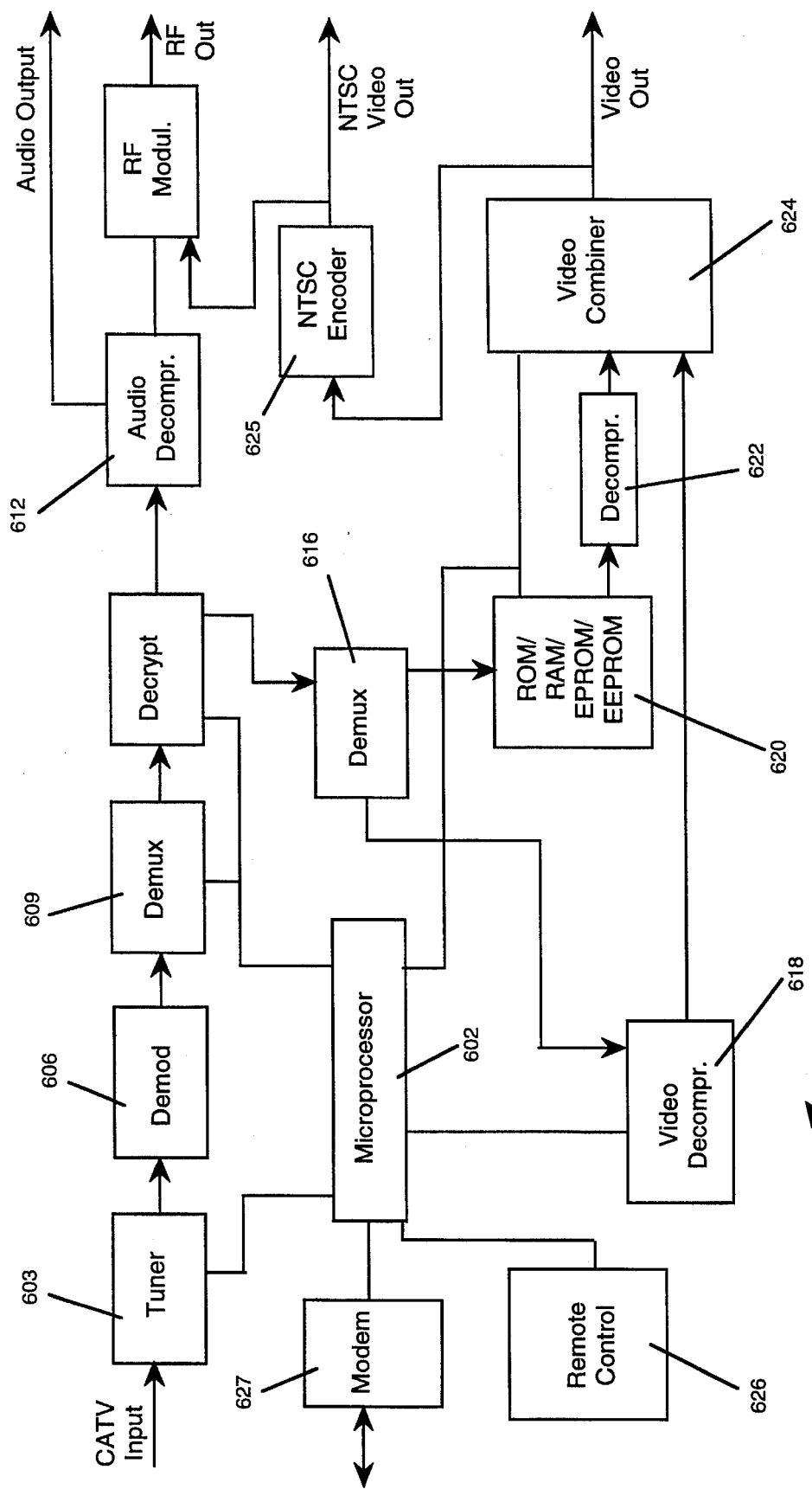
FIG. 4 is a block diagram of the hardware components of the set top terminal.

FIG. 4 shows the basic hardware components of the set top terminal 220. The set top terminal 220 has a tuner 603, digital demodulator 606, decryptor 600, and demultiplexers 609, 616 as well as audio equipment 612 and a remote control interface 626 for receiving and processing signals from the remote control unit 900. An optional modem 627 allows communication between a microprocessor 602 and the cable headend 208. An NTSC encoder 625 provides a standard NTSC video output.

The microprocessor 602 is capable of executing program instructions stored in memory. These instructions allow a user to access various menus by making selections on the remote control 900.

The manner in which the video is decompressed and the menus are generated from the program control information signal or STTCIS varies depending on the specific embodiment of the invention. Video decompressors 618 and 622 may be used if the video is compressed. The program control information signal may be demultiplexed into its component parts, and a video decompressor 618, graphic decompressor, text generator and video combiner 624 may be used to assist in creating the menus.

In addition to the menu format information that is stored in graphics memory, the set top terminal 220 also stores data tracking those programs that have been selected for viewing. By gathering this data, the set top terminal 220 can maintain an accurate record of all programs accessed/watched by storing the data in EEPROM or RAM. Subsequently, this data can be transmitted to the cable headend 208, where it can be used in carrying out network control and monitoring functions. Such data transmissions between the set top terminal 220 and cable headend 208 can be accomplished, for example, through upstream transmission over the cable network or over telephone lines through the use of telephone modems. Where upstream transmission over the cable network is used, the set top terminals 220 can complete data transmissions on a scheduled (e.g., using a polling response or status report to respond to polling requests sent from the cable headend 208) or as-needed (e.g., using a random access technique) basis.

Figure 5A:
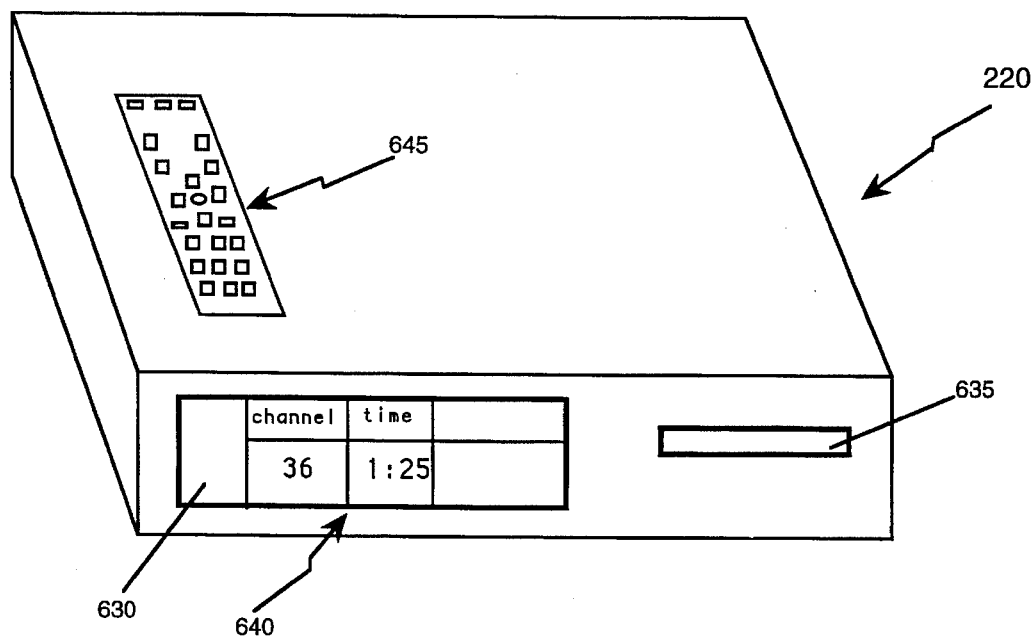
FIG. 5a is a perspective front view of a set top terminal.

FIG. 5a shows the front panel of the set top terminal 220, which includes an infrared sensor 630 and a series of LED displays 640. The LED displays 640 may indicate with an icon or a letter (e.g. A–K) the major menu currently selected by the set top terminal 220 or the channels selected directly by a user, or menu channel selections (e.g., from 1 to 50). Further displays may include current channel, time, volume level, sleep time, parental lock (security), account balance, use of a hardware upgrade, second channel being recorded by VCR, use of the Level D music hardware upgrade in a separate room, and any other displays useful to a subscriber to indicate the current status of the set top terminal 220. The LEDs 640 may also provide an indication of the digital audio channel currently tuned.

The set top terminal 220 includes a flapped opening 635 on its front that allows the insertion of a magnetic cartridge (or similar portable storage device, including optical disk, ROM, EPROM, etc. not shown). This cartridge opening 635 allows the set top terminal 220 to be upgraded or reprogrammed locally with the use of a magnetic tape cartridge.

On the top or cover of the set top terminal 220 are located pushbutton controls 645. Any function that can be performed on the remote 900 may also be performed at the set top terminal 220 using the duplicative pushbutton controls 645.

Figure 5B:
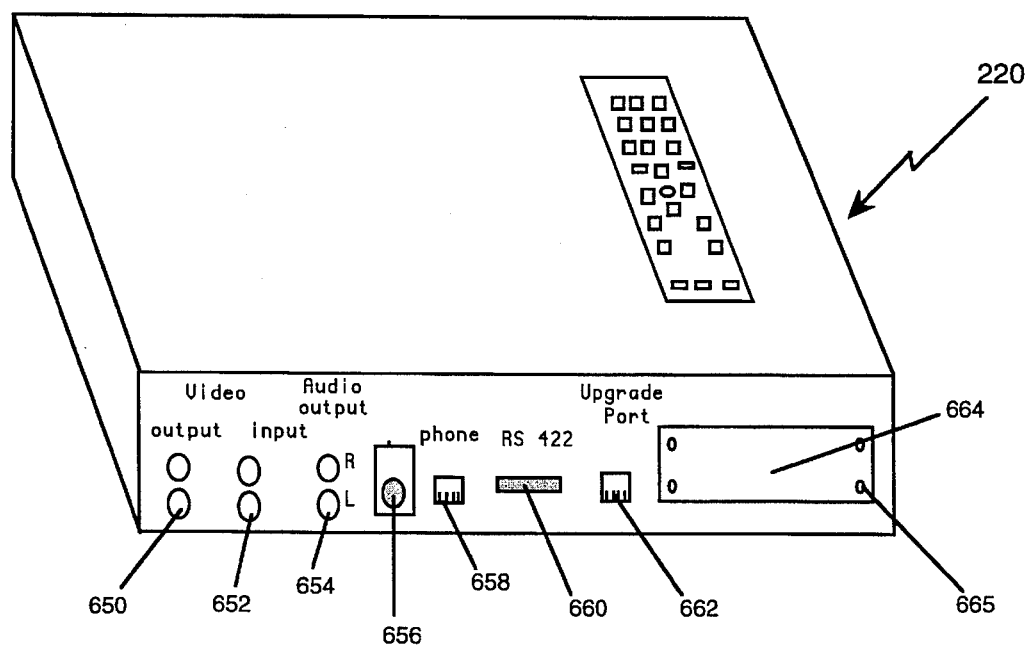
FIG. 5b is a perspective rear view of a set top terminal.

FIG. 5b shows the back of the set top terminal 220, which includes a pair of output terminals 650, pair of input terminals 652, pair of stereo/audio output terminals 654, satellite dish input port 656, telephone jack 658 and an RS-422 port 660. In addition, an upgrade port 662 and a cover plate 664 are held in place by a series of sheet metal screws. One of the output terminals 650 is for a television and the other is for a VCR. The set top terminal 220 is equipped to handle incoming signals on one or two cables using the input terminals 652. The phone Jack 658 and an RS-232 or RS-422 port 660 are provided for maintenance, trouble shooting, reprogramming and additional customer features. In alternate embodiments, the telephone Jack 658 may be used as the primary mode of communication between the cable headend 208 and the set top terminal 220. This connection is possible through the local telephone, cellular telephone or a personal communications network (PCN).

The basic programming of each set top terminal 220 is located on ROM within the set top terminal 220. Random access memory, the magnetic cartridge capability, and the expansion card slot 635 each allow upgrades and changes to be easily made to the set top terminal 220.

In the preferred embodiment, the set top terminal 220 includes a hardware upgrade port 662, in addition to expansion card slots. The hardware upgrade port 662 accommodates a four-wire (or more) connection for: (1) error corrected, decrypted data output of the set top terminal 220, (2) a control interface, (3) decompressed video output, and (4) a video input port. In the preferred embodiment, multiple wires are used to perform each of the four functions. The four sets of wires are combined in a single cable with a single multipin connector.

In the preferred embodiment, multipin connections may be used for the multiwire cable. The multipin connection 662 may range from DB9 to DB25. A variety of small computer systems interface (SCSI) ports may also be provided. Alternatively, four or more ports may be provided instead of the single port depicted.

Another port 662 is used to attach the various hardware upgrades described below to a set top terminal 220. The preferred embodiment has a number of hardware upgrades available for use with a set top terminal 220, including: (1) a Level A interactive unit, (2) a Level B interactive unit, (3) a Level C interactive unit with compact disc capability, (4) a Level D digital radio tuner for separate room use, and (5) a Level E information download unit. Each of these upgrades may be connected to the set top terminal 220 unit through the upgrade port 662 described earlier. The same four wires in a single cable described earlier may be used.

Existing set top converter boxes such as those made by Scientific Atlanta or General Instruments are presently unequipped to handle the menu selection system of the present invention. Thus, hardware modifications are necessary in order to use the menu selection system with existing set top converter technology.

Figure 6:
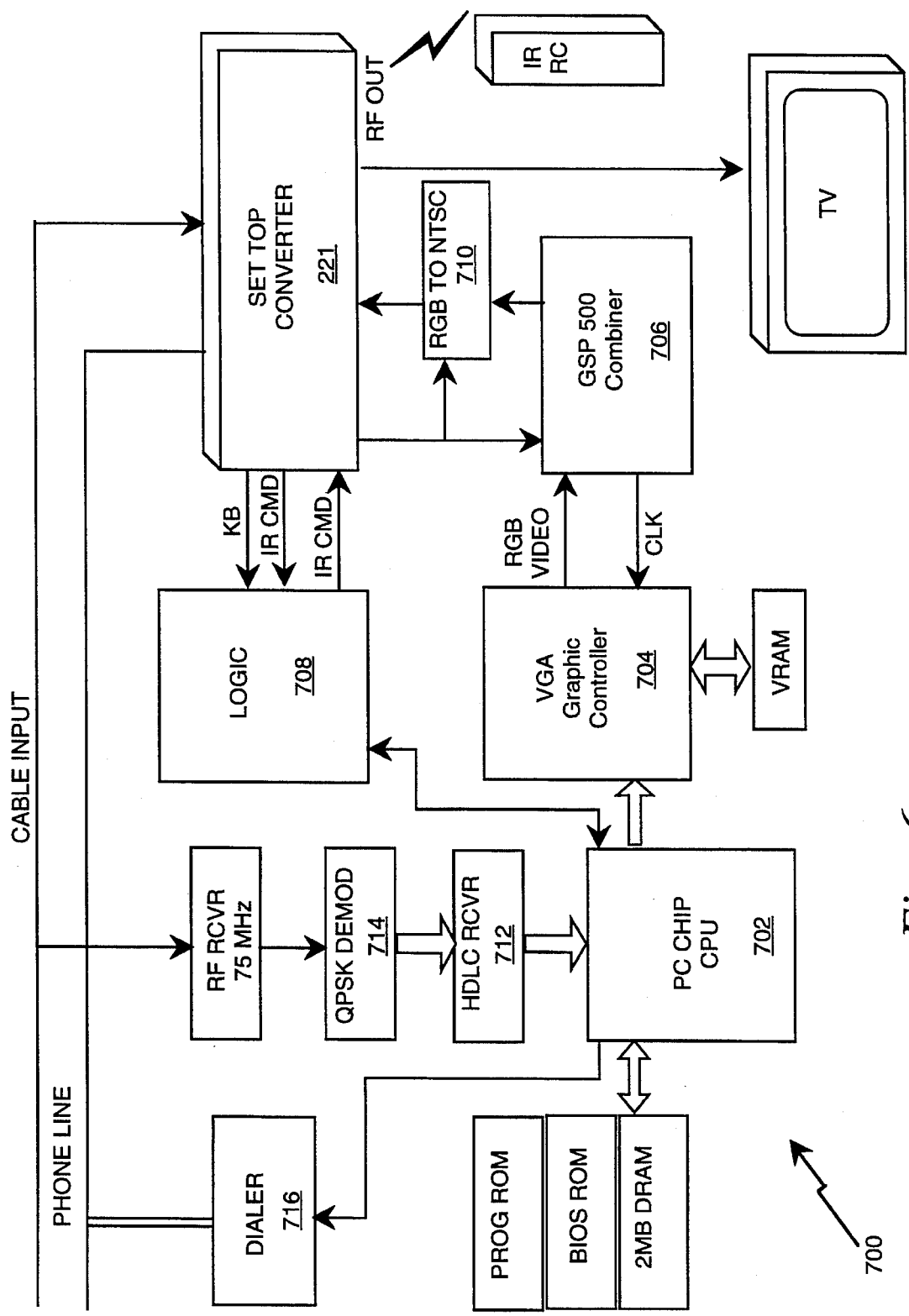
FIG. 6 is a schematic of a Turbo card upgrade for a set top terminal.

A Turbo Card addition to a set top converter is depicted in FIG. 6. The Turbo Card 700 shown provides the additional functionality needed to utilize the menu system with existing set top converter technology. The primary functions the Turbo Card 700 adds to the set top converter are the interpreting of program control information signals, generating of menus, sequencing of menus, and, ultimately, the ability of the viewer to select a channel through the menu system without entering any channel identifying information. The turbo card also provides a method for a remote location, such as the cable headend 208, to receive information on programs watched and control the operation of the set top converter and Turbo Card 700. The programs watched information and control commands may be passed from the cable headend 208 to the Turbo Card 700 using telephone lines.

The primary components of the Turbo Card 700 are a PC chip CPU 702, a VGA graphic controller 704, a video combiner 706, logic circuitry 708, NTSC encoder 710, a receiver 712, demodulator 714, and a dialer 716. The Turbo Card 700 operates by receiving the program control information signal from the cable headend 208 through the coaxial cable. The logic circuitry 708 of the Turbo Card 700 receives data, infrared commands, and synchronization signals from the set top converter. Menu selections made by the viewer on the remote control 900 are received by the set top converter's IR equipment and passed through to the Turbo Card 700. The Turbo Card 700 interprets the IR signal and determines the program (or menu) the viewer has selected. The Turbo Card 700 modifies the IR command to send the program selection information to the set top converter 221. The modified IR command contains the channel information needed by the set top converter. Using the phone line and dialer 716, the Turbo Card 700 is able to transmit program access information to the cable headend 208.

In the preferred embodiment, program access information is stored at each set top terminal 220 until it is polled by the network controller 214 using a polling request message format as shown in FIG. 7a. This frame format 920 consists of six fields, namely: (1) a leading flag 922 at the beginning of the message, (2) an address field 924, (3) a subscriber region designation 926, (4) a set top terminal identifier 928 that includes a polling command/response (or P/F) bit 930, (5) an information field 932, and (6) a trailing flag 934 at the end of the message. FIG. 7b shows a response frame format 920' (similar to the frame format 920 end, therefore, commonly numbered with the frame depicted in FIG. 7a, but with the prime indicator added for clarity) for information communicated by the set top terminal 220 to the network controller 214 in response to the polling request of FIG. 7a.

The eight-bit flag sequence 922 that appears at the beginning and end of a frame is used to establish and maintain synchronization. Such a sequence typically consists of a "01111110" bit-stream. The address field 924 designates a 4-bit address for a given set top terminal 220. The subscriber region designation 926 is a 4-bit field that indicates the geographical region in which the subscriber's set top terminal 220 is housed. The set top terminal identifier 928 is a 16-bit field that uniquely identifies each set top terminal 220 with a 15-bit designation followed by an appended P/F bit 930. Although field size is provided by this example, a variety of sizes can be used with the present invention.

The P/F bit 930 is used to command a polling response from the set top terminal 220 addressed, as described below. The response frame format 920' also provides a variable-length information field 932' for other data transmissions, such as information on system updates. The frame format 920' ends with an 8-bit flag (or trailing flag) 934' that is identical in format to the leading flag 922', as set forth above. Other frame formats (e.g., MPEG) will be apparent to one skilled in the art and can be easily adapted for use with the system.

Figure 8:
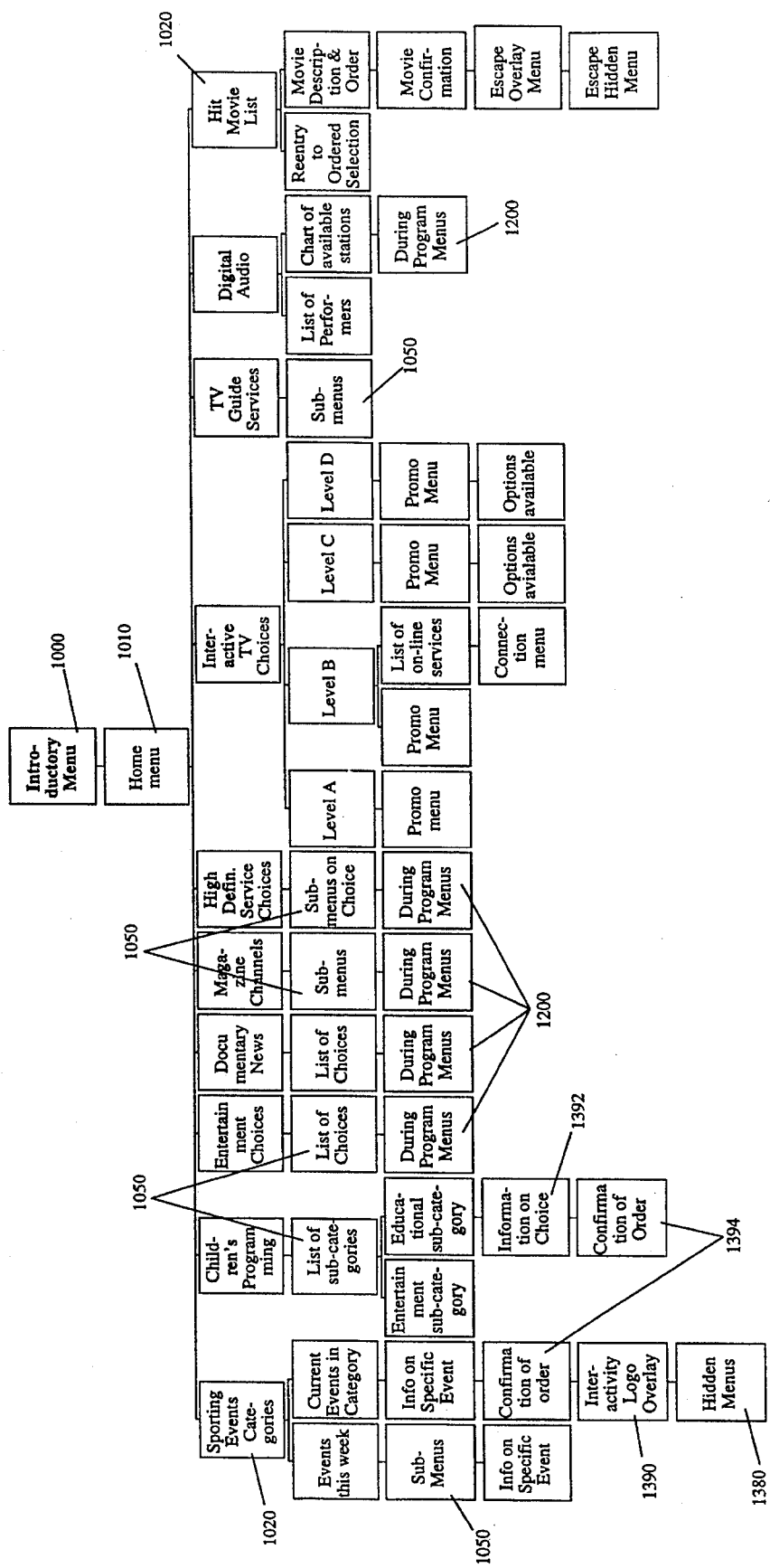
FIG. 8 is a drawing of the basic menus used in the present invention, including ten major menus represented by icons.

As summarized above, images or programs may be selected for display by sequencing through a series of menus. FIG. 8 is an example of one possible structure for a series of menus. Generally, the sequence of menus is structured with an introductory menu, a home menu, various major menus and a multitude of submenus. The submenus can include promo menus and during program menus. For example, at the home menu portion of the sequence of menus and corresponding software routines, a subscriber may select one of the major menus and start a sequence of menu displays. Alternatively, a subscriber may go directly to a major menu by depressing a menu select button on remote control 900.

At any time during the menu sequence, the subscriber may depress a major menu button to move into another series of menus. In this way, a subscriber may move from major menu to major menu.

The various software subroutines executed by the microprocessor 602 allow a subscriber to sequence the menus, navigating through the various menus of the present invention. A subscriber may sequence back through menus or return to the home menu with a single touch of the home menu button on remote 900.

An introductory menu screen 1000 automatically appears upon power-up and initialization of the set top terminal 220. From this introductory menu screen 1000, the set top terminal software will normally advance the subscriber to the home menu screen 1010. The home menu 1010 is the basic menu that the subscriber will return to in order to make the first level of viewing decisions. When the set top terminal software is displaying the home menu 1010, the subscriber is able to access any television programming option. The software allows programming options to be entered through cursor movement on the screen and directly by button selection on the remote control 900.

In the normal progression through the menu screens, the software will forward the subscriber to a major menu screen 1020 in response to the subscriber's remote control 900 selection or highlighted cursor selection from the home menu screen 1010. The selections displayed on the home menu 1010 are for large categories of programming options.

Following the major menu 1020, the subscriber may navigate through one or more submenu screens 1050 from which the subscriber may choose one particular program for viewing. For most programming selections, the user will proceed from the home menu 1010 to a major menu 1020 and then to one or more submenus 1050. However, for certain programming options or functions of the set top terminal 220, the user may skip one or more menus in the sequence.

The During Program Menus 1200 are submenus enabled by the set top terminal software only after the subscriber has selected a television program. These menus provide the subscriber with additional functionality and/or additional information while viewing a selected program. The During Program Menus 1200 sequence can be further subdivided into at least two types of menus, Hidden Menus 1380 and Program Overlay Menus 1390.

To avoid disturbing a subscriber during viewing of a program, the Hidden Menus 1380 are not shown to the subscriber but instead "reside" at the set top terminal 220 microprocessor 602. The microprocessor 602 awaits a button entry either from the remote control 900 or set top terminal 220 buttons before executing or displaying any Hidden Menu 1380 options. The set top terminal software provides the subscriber with additional functions such as entering an interactive mode or escaping from a selected program through use of Hidden Menus 1380.

Program Overlay Menus 1390 are similar to Hidden Menus 1380. However, the Program Overlay Menus 1390 are overlayed onto portions of the displayed video and not hidden. The software for the Program Overlay Menus 1390 allows the subscriber to continue to watch the selected television program with audio but places graphical information on a portion of the television screen. Most Program Overlay Menus 1390 are graphically generated to cover small portions of video. Some Overlays 1390 which are by their nature more important than the program being viewed will overlay onto greater portions of the video. Examples of types of overlay menus 1390 include Notification Menus 1392 and Confirmation Menus 1394. In the preferred embodiment, the software for the Program Overlay Menus 1390 controls the reduction or scales down the (entire) programs video and redirects the video to a portion of the screen.

Submenus provide the cost of viewing the program and the program's length in hours and minutes. From the submenus, the subscriber is given at least three options: (1) to purchase a program, (2) to return to the previous menu, and (3) to press "go" and return to regular TV. The subscriber may also be given other options such as previewing the program.

Using an on-screen menu approach to program selection, there is nearly an unlimited number of menus that can be shown to the subscriber. The memory capability of the set top terminal 220 and the quantity of information that is sent using the program control information signal are the only limits on the number of menus and amount of information that can be displayed to the subscriber. The approach of using a series of menus in a simple tree sequence is both easy for the subscriber to use and simply implemented by the set top terminal 220 and remote control device 900 with cursor movement. A user interface software programmer will find many obvious variations from the preferred embodiment described.

The set top terminal 220 generates and creates menus using, in part, information stored in Its graphics memory. A background graphics file 800 will store menu backgrounds and a logo graphics file will store any necessary logos. A menu display and cursor graphics file will store menu display blocks and cursor highlight overlays as well as any other miscellaneous files needed to build the menus. Using this method of storing menus, the menus can be changed by reprogramming the graphics memory of the set top terminal 220 through instructions from either the network controller 214 or operations center 202.

The microprocessor 602 performs the steps required to create a menu using stored information. The microprocessor 602 fetches a background file, logo file, menu display and cursor file in most instances. The microprocessor 602 fetches text from long-term, intermediate-term, or short-term storage depending on where the text is stored. Using a video combiner (or like device), the stored information is combined with video and the entire image is sent to the television screen for display.

In the preferred embodiment, a graphics controller is used to assist the set top terminal 220 in generating menus. Menu generation by the set top terminal 220 begins with the building of a major menu screen, which includes background graphics for that major menu. The background graphics may include an upper sash across the top of the screen and a lower sash across the bottom of the screen. The background graphics may be generated from the background graphics file 800 in the memory files of the graphics memory (preferably EEPROM). In addition, logo graphics may be generated. Such graphics typically include an icon window, a cable company logo, a channel company logo, and two "go" buttons.

Preferably, the text for each major menu is generated separately by a text generator in the set top terminal 220. Those portions of the text that generally remain the same for a period of weeks or months may be stored in EEPROM or other local storage. Text which changes on a regular basis, such as the movie titles (or other program selections), is transmitted to the set top terminal 220 by either the operations center 202 or the network controller 214 of the cable headend 208. In this manner, the cable headend 208 may change the program selections available on any major menu 1020 by modifying the program control information signal sent by the operations center 202 and transmitting any changes using the STTCIS.

Day, date and time information are added to each major menu. This information is sent from the operations center 202, the cable headend 208 (signal processor 209 or network controller 214), the uplink site, or generated by the set top terminal 220 internally.

The creation and display of program description submenus is performed by the set top terminal 220 in a manner similar to that described above. Each submenu may be created in parts and combined before being sent to the television screen. Preferably, background graphics and upper and lower sashes are used. Likewise, a video window and half-strip window can be generated from information in storage on the EEPROM.

In addition to graphics and text, some submenus include windows that show video. Such video may be still or moving pictures. Still pictures may be stored in a compressed format (such as JPEG) at the set top terminal 220. Video stills may be transmitted by the operations center 202 through the program control information signal from time to time.

Moving video picture is obtained directly from a current video feed as described above. Depending on video window size, this may require manipulation of the video signal, including scaling down the size of the video and redirecting the video to the portion of the menu screen which is within the video window of the menu. Alternatively, the video may be obtained from a split screen channel. Such a method involves the use of split screen video techniques to send multiple video clips on a single channel at a given time. The set top terminal 220 would scale the picture, if necessary, and redirect it to the correct position on the screen using known scaling and positioning techniques. Additional circuitry may be required in the set top terminal 220 to perform adequate scaling and repositioning.

To avoid the need for redirecting video into the portion of the screen which houses the video window, masking and menu graphics may be used to cover the portions of the channel video that are not needed. This masking technique allows the split screen video to remain in the same portion of the screen that it is transmitted by the operations center 202. The masking is then adjusted to cover the undesired portions of the screen. These masks are stored in the background graphics file similarly to other background files for menus.

The split screen video technique may also be used for promoting television programming. Since a great number of short video clips may be sent continuously, full or partial screen promotionals (or informationals) may be provided to the subscriber. With this large quantity of promotional video, the subscriber is given the opportunity to "graze" through new movie or television programming selections. The subscriber simply grazes from promotional video to promotional video until the desired television program is discovered.

C. Program Control Information Signal

Throughout the present application, the term "program control information" is being used to indicate control information coming from the cable headend 208 to the set top terminal 220, whether it is sent directly from the Operations Center 202, processed by the network controller 214 and then forwarded to the set top box, or transmitted over telephone lines.

The program control information signal generated by the Operations Center 202 provides data on the scheduling and description of programs to the network controller 214 or, in an alternate configuration, directly to the set top terminal 220 for display to the subscriber. In the preferred embodiment, the program control information signal is stored and modified by the network controller 214 and sent to the set top terminal 220 in the form of a set top terminal control information stream (STTCIS). This configuration is required to accommodate differences in individual cable systems and possible differences in set top terminal devices. The set top terminal 220 integrates either the program control information signal or the set top terminal control information stream together with data stored in the memory of the set top terminal 220, to generate on-screen displays for assisting the subscriber in choosing programs.

The goal of the menu driven program selection system 200 is to allow the subscriber to choose a program by touring through a series of menus, organized generally as depicted in FIG. 8, utilizing the remote control 900 for cursor movement. The final choice in the series of menus will identify one particular channel and one time for activation of that channel. Armed with a channel and activation time the set top terminal 220 can display the selected program on the television for the viewer. To achieve this goal a simple embodiment assigns an intelligent alpha-numeric code to each program. This alpha-numeric code identifies the category of the program, the menu in which the program should be displayed, its transmission time(s), and the position on the menu that the program should be displayed.

In this simple embodiment, the program control information, including menu codes, is sent continuously from the Operations Center 202 to the network controller 214, and ultimately to the set top terminal 220. For example, four hours worth of programming information can be sent via the program control information signal continuously as shown in Table A.

Table A shows the basic programming information that may be sent to the set top terminal 220. The program descriptions shown are coded abbreviations. For example, C for comedy, N for news, S for sports, A for cartoons, and Tx for text. If there is a textual description for a program, such as a movie, the description may be given following that program's coded description or may be communicated following the four hours' worth of programming information. As is shown in the coded listing, program descriptions for programs greater than a half hour in length need not be repeated (each half hour). The video description code informs the set top terminal 220 of whether there is still or live video available to advertise the program.

For example, a sporting program may be assigned a code of B35-010194-1600-3.25-Michigan St. vs. USC. The letter B would assign the program to category B, sports. The second alpha-numeric character number 3 would assign the program to the third menu of the sports category. The third character of the code, number 5, assigns the program to the fifth program slot on the third menu. The next six characters, 01/01/94, represent the date. The following four characters, 1600 represent the start time which is followed by the length of the program and the program name. This entry represents a sports show, a college football game, which will be aired at 4:00 PM on New Years day 1994.

TABLE A

| *Program name | *Program length | *Menu code | *Description | *Video |
|---|---|---|---|---|
| 12 PM | | | | |
| 1 Cheers | .5 | E24 | C | N |
| 2 Terminator | 2.0 | A33 | Tx | S |
| 3 PrimeTime | 1.0 | D14 | N | N |
| 4 Football Special | .5 | B24 | S | N |
| . | | | | |
| . | | | | |
| . | | | | |
| 12:30 PM | | | | |
| 1 Simpsons | .5 | E14 & C13 | C | S |
| 4 Football Game | 3.0 | B13 | S | N |
| . | | | | |
| . | | | | |
| . | | | | |

In the 12:30 Channel 1 entry of Table A, two menu codes are shown. By allowing two menu codes, programs that may fit under two different category descriptions may be shown in both menus to the subscriber. With this minimal amount of information being communicated to the set top terminal 220 on a regular basis, the terminal is able to determine the proper menu location for each program and the proper time and channel to activate for the subscriber after his menu selection.

Table B shows an example Events Table that may be downloaded to a set top terminal 220 using the Event. Dat file which contains information about events and pricing. As shown in the table, the three columns of the Events Table identify the field number, the field itself and the type of information downloaded in the Event. Dat file. The first column contains the field numbers 1 through 11. The middle column contains the corresponding field parameters, including the event type, event ID, global channel ID, price, start time, end time, start date, end date, P- icon, name and description. The third column contains corresponding field type information. Field type information typically consists of an unsigned integer; hours, minutes and seconds; months, day and year; and ASCII character identifier.

TABLE B

| Field # | Field | Type |
|---|---|---|
| 1 | Event Type<br>1 = YCTV<br>2 = Pay-Per-View<br>3 = Reg. TV | Unsigned Int |
| 2 | Event ID | Unsigned Int |
| 3 | Global Channel ID | Unsigned Int |
| 4 | Price (in Cents) | Unsigned Int |
| 5 | Start Time | HH:MM:SS |
| 6 | End Time | HH:MM:SS |
| 7 | Start Date | MM/DD/YY |
| 8 | End Date | MM/DD/YY |
| 9 | P-Icon | ASCIIZ |
| 10 | Name | ASCIIZ |
| 11 | Description | ASCIIZ |

Table C shows an example Event. Dat data file. In particular, Table C shows two data streams corresponding to two event types. The first data stream identifies a YCTV™ event in the first field. The second field designates the event ID, which is 1234 in this example. The third field includes the global channel ID number two. The fourth field indicates the cost of 50 cents for this event. The fifth and sixth fields indicate the respective start and end times of 3:00 AM to 3:00 PM, respectively. The seventh and eighth fields show the corresponding start and end dates, designated as 8/25/93 and 8/27/93, respectively. Field nine indicates the P-icon set to PBS.PCX graphics file. Finally, fields ten and eleven indicate the name and description of the events selected, which in this case are Sesame Street™ and Barney™. The second data stream in the Event. Dat example shown in Table C includes analogous information for Terminator IV™, which is designated in field one as a pay-per-view event.

TABLE C

| Event.Dat Example |
|---|
| 1`1234`2`50`03:00:00`15:00:00`08/25/93`08/27/93`pbs.pcx`Sesame Street & Barney's Sesame Street and Barney Abstract |
| 2`1234`2`50`20:00:00`22:00:00`08/25/93`08/25/93`08/25/93`t4.pcx`Terminator 4`Terminator 4 Abstract |

The program control information signal and STTCIS can be formatted in a variety of ways and the on-screen menus can be produced in many different ways. For instance, if the program control information signal carries no menu format information, the menu format for creating the menus can be fixed in ROM at the set top terminal. This method allows the program control information signal to carry less information but has the least flexibility since the menu formats can not be changed without physically swapping the ROM.

In the preferred embodiment, the menu format information is stored at the set top terminal 220 in temporary memory either in a RAM, FLASH ROM, EEPROM or EPROM. This configuration provides the desired flexibility in the menu format while still limiting the amount of information needed to be communicated via the program control information signal. New menu format information can be sent via the program control information signal or the STTCIS to the set top terminals 220 each time there is a change to a menu.

Program access information for each program watched is stored at the set top terminal 220 until it is polled by the network controller 214 for information retrieval using the program control information signal or STTCIS. This information retrieval can be accomplished by using the polling request message and response formats, 920 and 920' respectively, as shown, and FIGS. 7a and 7b, and described above, but any suitable polling request and response message format may be used to interrogate each set top terminal 220 sequentially, one by one. The set top terminals 220 are identified by a unique address and set top terminal identifier. It is preferred that the set top terminal 220 transmit information and messages to the network controller 214 only when given permission by the network controller 214 to do so.

Where, for example, specialty programs have been accessed since the previous poll, the set top terminal 220 is given permission to transmit a polling response 920' in the form of a status report that includes any such access information. The network controller's control receiver (not shown) is tasked with the receipt of set top terminal polling responses or status reports. These status reports generally include information that allows the network controller 214 to track a subscriber's program access history.

FIG. 7b shows an example of frame format 920' for the status reports received from the set top terminals 220 during the polling cycle. This frame format is identical to the polling request message format 920 and, as described, includes: (1) a leading flag 922' at the beginning of the message, (2) an address field 924', (3) a subscriber region designation 926', (4) a set top terminal identifier 928' that includes a polling command/response (or P/F) bit 930', (5) an information field 932', and (6) a trailing flag 934' at the end of the message.

The information field 932' remains variable in length so that the status of an indeterminate number of programs, represented at 931, accessed can be included in the frame. In this way, the control message length of the polling request message is minimal since the network controller 214 does not transmit such access information. After a polling response by a given set top terminal 220, however, the control message length increases in proportion to the number of programs accessed.

During transmission, the P/F bit is used to carry out the polling function. In particular, the P/F bit is set to a "1" position to command a polling response from the set top terminal 220 whose address is identified in the frame. The set top terminal 220 addressed must respond to the command in the same P/F bit also set to the "1" position. The response will include the number of programs accessed and their corresponding event identification numbers as shown in FIG. 7b at 931. In cases where the set top terminal 220 has not accessed any programs since the previous polling cycle, the set top terminal 220 responds with the P/F bit set to "1" and the programs access block denoting zero programs accessed.

In between polling cycles, the program control information continues to supply the set top terminals 220 with menu information. In the simplest embodiment, the menus remain fixed and only the text changes. Thus, the program control information signal can be limited to primarily text and a text generator can be employed in the set top terminal 220. This simple embodiment keeps the cost of the set top terminal 220 low and limits the bandwidth necessary for the program control information. Another simple embodiment uses a separate channel full-time (large bandwidth) just for the menu information. This separate channel would facilitate the rapid downloading of new graphics for the system and would enhance response time when text and other data information needs to be changed.

Figure 9A:
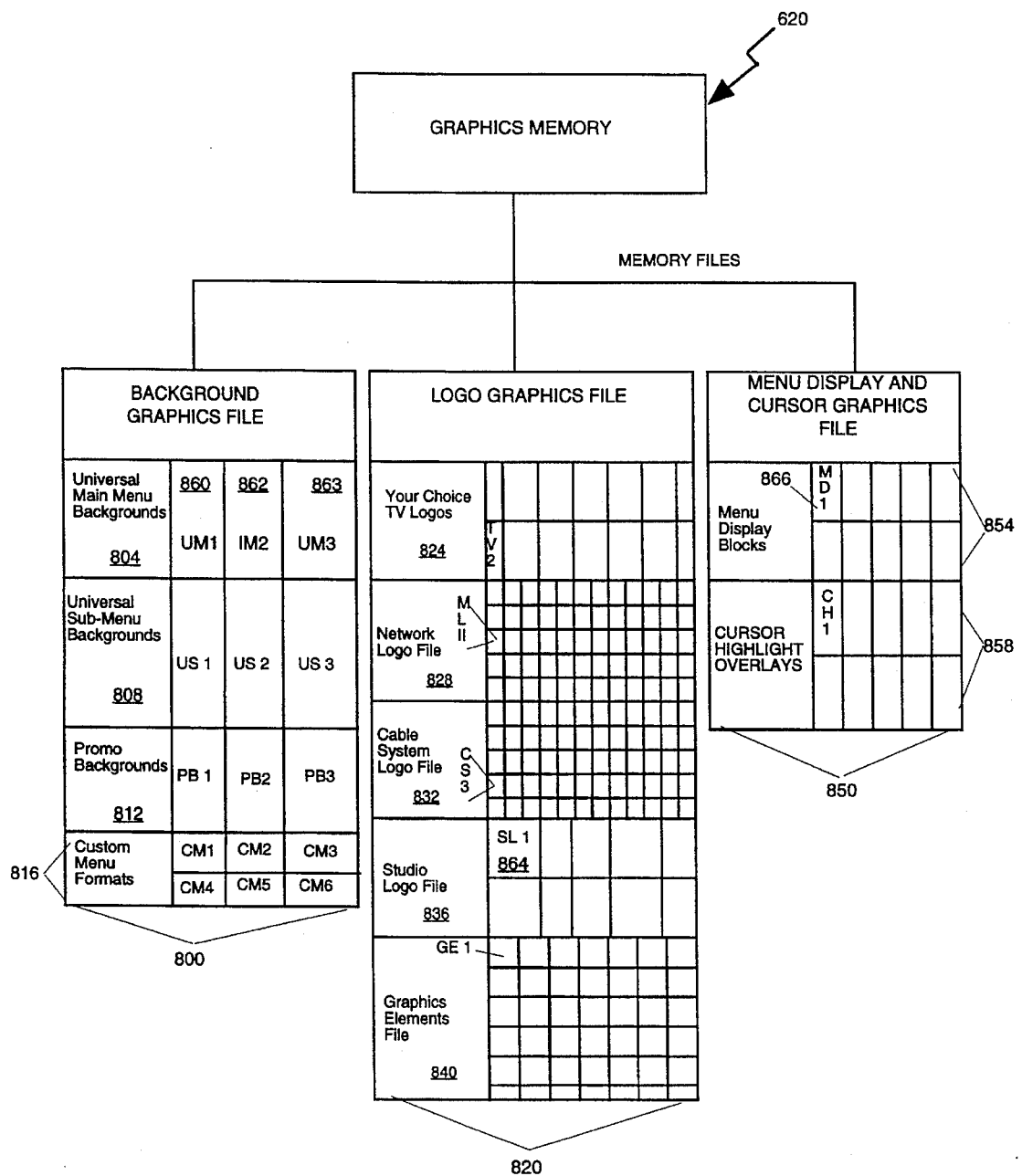
FIG. 9a is a drawing of storage for on-screen menu templates and other graphics files stored in graphics memory of the set top terminal.

In the preferred embodiment, the basic building blocks or templates of the on-screen menu displays will be stored in graphics memory consisting of nonvolatile RAM, FLASH ROM, EPROM, or preferably, EEPROM, as shown as 620 in FIG. 9a. Referring to FIG. 4, with the information from the graphics memory 620, the microprocessor 602, graphics decompressor 622, a text generator (not shown in FIG. 4, but incorporated if necessary), and video combiner 624 will build a menu screen.

The memory files of the graphics memory are preferably categorized into three categories, background graphics 800, logo graphics 820, and menu and display graphics 850, as shown in FIG. 9a.

The background graphics file 800 will store menu backgrounds such as: universal main menu backgrounds 804, universal submenu backgrounds 808, promo backgrounds 812 and custom menu formats 816. The logo graphics file 820 will store any necessary logos such as: Your Choice TV™ logos 824, Network logo files 828, cable system logo files 832, studio logo files 836, and graphic elements file 840. The menu display and cursor graphics file 850 will store menu display blocks 854 and cursor highlight overlays 858, as well as any other miscellaneous files needed to build the menus.

Using this method of storing menus discussed above, the menus can be changed by reprogramming the graphics memory 620 of the set top terminal 220. To revise the entire design of displayed menus, the network controller 214 or operations center 202 instructs the EEPROM 620 to be erased and reprogrammed with new menu templates. To change one menu format or logo, the network controller 214 or operations center 202 instructs Just the one location in memory to be erased and rewritten. Obviously, this menu reprogramming can also be done locally (at the set top terminal 220) by a servicemen.

As shown in FIG. 9a, each memory subfile is further divided into various memory blocks. For example, the background graphics file 800 contains the universal main menu backgrounds 804. The universal main menu backgrounds memory 804 includes memory units UM1 860, UM2 862 and UM3 863. Similarly, the logo graphics file 820 and menu display and curser graphics file 850 contain individual subfile memory blocks (for example, studio logo file 836 has memory block SL1 864; menu display blocks 854 has memory menu display block MD1 866).

Figure 9B:
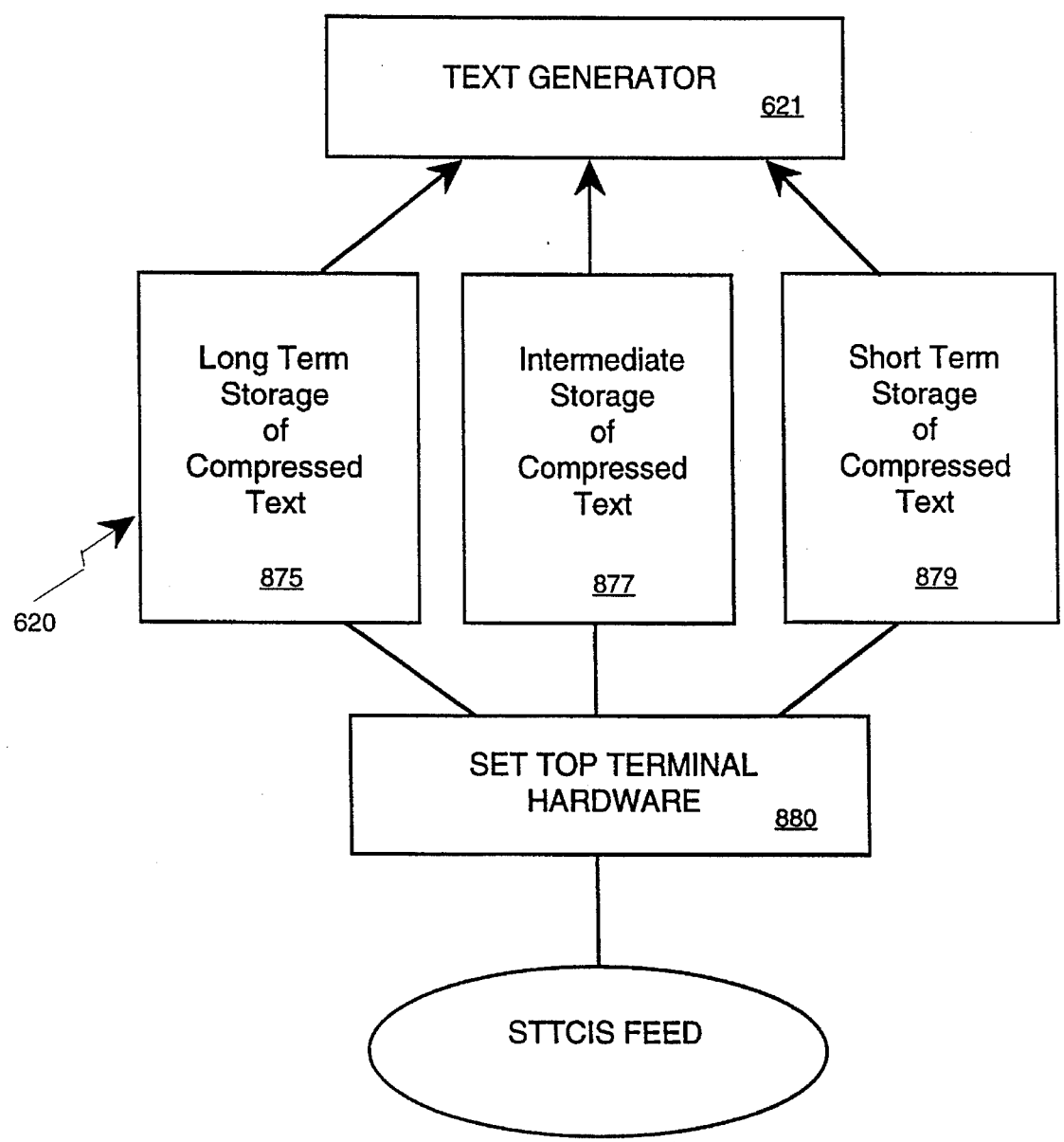
FIG. 9b is a drawing showing the hierarchical storage of text in memory for the set top terminal.

FIG. 9b shows the hierarchical storage of text transmitted from the cable headend 208. Although text may be continuously transmitted with the video signals to set top terminals 220, text may also be transmitted intermittently. In such a case, the text is stored in the set top terminal 220. Preferably, the text is transmitted and stored in a compressed format using known techniques. Additionally, the text is preferably stored in graphics memory 620 within the set top terminal 220.

Depending upon the use of the text, it will be stored in one of three portions of memory. Information sent with the text will either direct the text to a particular portion of memory, or include information as to the priority of text. The microprocessor 602, part of the set top terminal hardware represented at block 880, may then direct the text to the appropriate memory location for storage.

If the text is to be used frequently and over a long period of time a long term storage 875 will be used. If the text will be used for a shorter period of time (for example, a month), the text will be directed to an intermediate storage area 877. If the text is to be used almost immediately, or for a short period of time (for example, within a few days) the text is directed to a short term storage area 879. The microprocessor 602 locates the appropriate text required for a particular menu and retrieves it from the appropriate portion of memory 620. The text is output from the graphics memory 620 to the text generator 621. Text generated from the text generator 621 is thereafter directed to text/graphics video combiner 624.

Figure 9C:
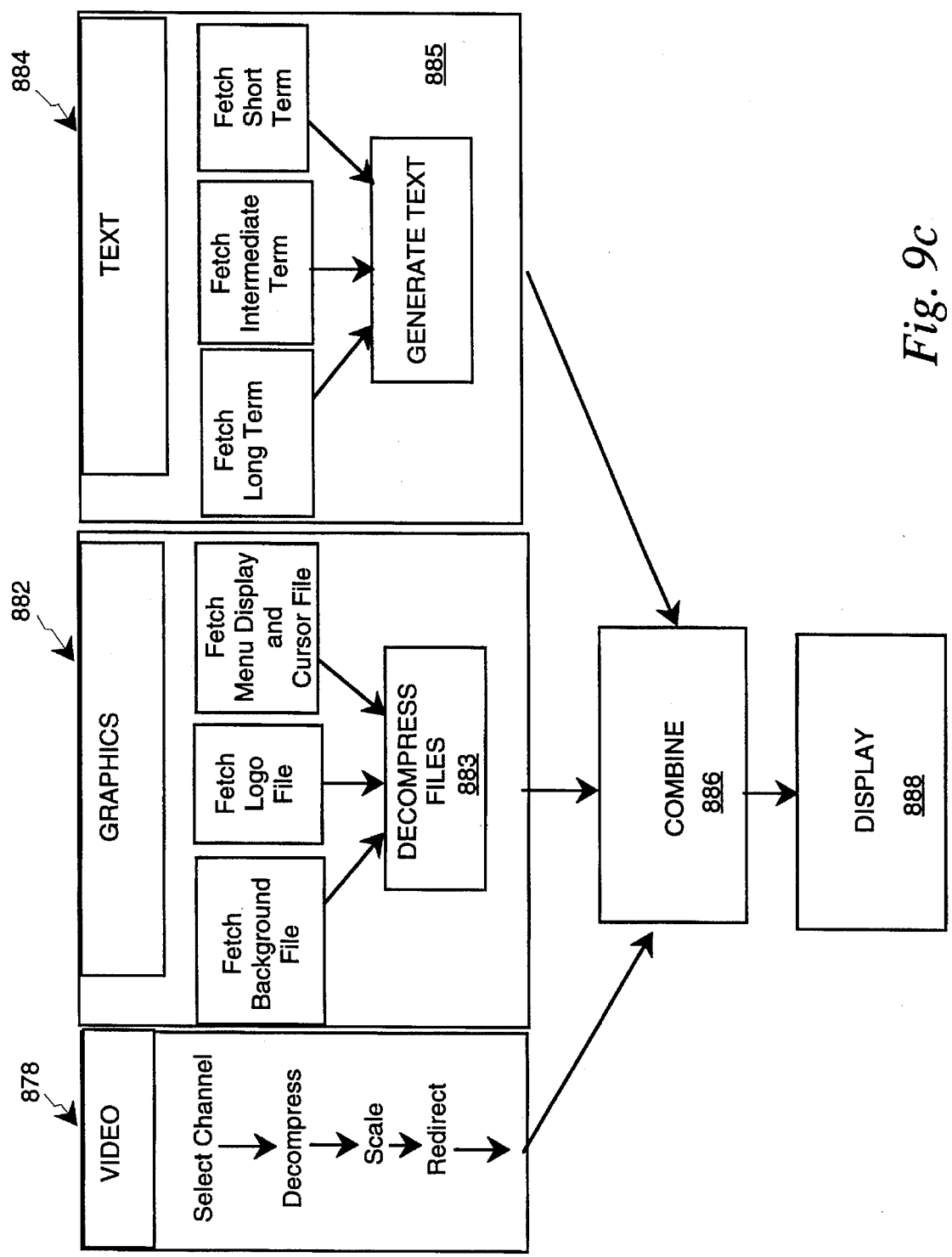
FIG. 9c is a drawing of a flow chart showing the steps required for the microprocessor to retrieve, combine and display a menu.

FIG. 9c shows the steps performed by the microprocessor 602 for creating a menu based upon a series of overlay screens. These instructions are stored in memory within the set top terminal 220 in a screens data file. The screens data file instructs the microprocessor 602 on the location of each graphics file on the screen. An example screens data file is shown in Table D, wherein the screens data file specifies menu data positioning in terms of, for example, x and y pixel positions, height and width, color codes and fonts. Alternatively, instructions or routines may be transmitted from the operations center 202 to be stored in memory within the individual set top terminals 220.

any), with as many screens of a decompressed graphics as are necessary, and any text, block 886. The image or portions of the image are stored in the video combiner (for example, combiner 624 of FIG. 4) until all overlays are received. Thereafter, the entire image is sent, under direction of another routine, to be displayed on the television screen, as represented by display block 888.

The terms and descriptions used herein are set forth by way of illustration only and are not meant as limitations. Those skilled in the art will recognize that numerous variations are possible within the spirit and scope of the invention as defined in the following claims.

What is claimed is:

1. A television program delivery and program selection system offering a plurality of television programs for selection by a subscriber, using a program control information signal carrying data on program lineups of the plurality of the television programs and using computer program instructions stored at each subscriber location to present options on a menu displayed on a television, the system comprising:

an operations center for creating a plurality of television program lineups and for generating the program control information signal that includes data on the plurality of television program lineups and control

TABLE D

~The following data lines are for the main menu

|   | Screen Type | Template File |   |   | Description |   |   |   |   |   |   |
|---|---|---|---|---|---|---|---|---|---|---|---|
| SCREEN | `@MAIN | `main menu.pcx |   |   | `Main Menu |   |   |   |   |   |   |
|   | Justify | X | Y | Ht | Wd | FColor | BColor |   | Font |   |   |
| STR POS | `Left | `165 | `85 | `30 | `300 | `27 | `55 |   | FUTUR14.GFT |   |   |
| STRING`MAIN MENU |
|   | JUSTIFY | X | Y | Hght | Wdt |
| PCX POS | `LEFT | `190 | `75 | `200 | `200 |
| PCX example.pcs |
|   | Justify | X | Y | Ht | Wd | FColor | BColor Font | | X | Y | Ht | Wd |
| ITEM POS | `Left | `120 | `100 | `20 | `400 | `15 | `25 FUTUR12.GFT | | `110 | `90 | `30 | `420 |
| ITEM`@YCTV`YOUR CHOICE TV |
|   | Justify | X | Y | Ht | Wd | FColor | BColor Font | | X | Y | Ht | Wd |
| ITEM POS | `Left | `120 | `200 | `20 | `400 | `15 | `25 FUTUR12.GFT | | `110 | `190 | `30 | `420 |
| ITEM`@PPV`PAY-PER-VIEW HIT MOVIES |

As shown at block 878 in FIG. 9c, initially the microprocessor 602 instructs the tuner 603 to select a channel. The channel is decompressed, error corrected and decrypted, if necessary. If the video is to be reduced in size, so as to be placed within a video window, or is a split screen video window which must be enlarged, the video is scaled to the appropriate size. Additionally, the video may be required to be redirected to a portion of the television screen, accomplished by creating a series of offsets for each pixel location of the video.

Graphics must also be used to create a menu in most instances. As shown in block 882, the microprocessor 602 must fetch a background file, a logo file, and a menu display and cursor file in most instances. Each of these files is decompressed 883, and then combined, block 886.

Similarly, the microprocessor 602 must fetch text, as shown in block 884. Depending upon the memory location of the text, the microprocessor 602 will fetch the text from long-term, intermediate-term, or short-term storage, as described above. Based upon this memory retrieval, the text is generated, block 885, and combined with the video (if information for use at the subscriber location, the operations center comprising a computer assisted packaging system;

delivery means, connected to the computer assisted packaging system, for delivering at least one of the plurality of television program lineups included in the program control information signal from the operations center to the subscriber location;

menu generation means, operably connected to the delivery means, for generating menus with the options presented for display, the menu generation means comprising a microprocessor for using the stored computer program instructions to assist in generating menus, wherein the menu generation means is located at the subscriber location; and selection means, connected to the menu generation means, for selecting at least one of the plurality of television programs for display on the television using the options on the generated menus, the selection means comprising a subscriber interface.

2. The system of claim 1, wherein specific data and information about the plurality of television programs is used and wherein the operations center comprises:

means for receiving the plurality of television programs used for creating the plurality of television program lineups;

input means for receiving the information about each of the plurality of television programs;

database means for storing and supplying the specific data about the plurality of television programs;

means, connected to the input means and the database means, for generating the program control information signal based on the information from the input means and the specific data from the database means; and means, connected to the receiving means and generating means, for combining the plurality of television programs and the program control information signal for transmission by the delivery means.

3. The system of claim 1, wherein the operations center performs bandwidth allocation and wherein the operations center comprises processing means for controlling the content of the program control information signal, the processing means comprising:

means for creating the plurality of television program lineups for transmission to subscribers;

means for prioritizing the programs based on a plurality of factors including popularity of the program, its weighted importance and bandwidth available to the subscribers that receive the plurality of television programs;

means for allocating bandwidth so that different television program lineups are delivered to different subscribers; and means, connected to the prioritizing means and the allocation means, for creating and changing menus with different programs described for different subscribers using the prioritizing means and the allocation means.

4. The system of claim 1, wherein the operations center comprises means for generating a category designation for each of the plurality of the television programs.

5. The system of claim 1, wherein the selection means comprises:

a means for choosing one of the options on the generated menus; and a means for sequencing the stored computer program instructions based on the chosen option.

6. The system of claim 1, wherein the system performs menu generation using the stored computer program instructions, menu content data, and data carried on the program control information signal including program identification and menu location for each program identification, wherein the menu generation means comprises:

means located at the subscriber location for receiving the program control information signal containing the program identification and menu locations;

a microprocessor for executing the computer program instructions for prompting the generation of menus;

menu memory means, connected to the microprocessor, for storing information used to generate menus, the stored information including the program identification and menu locations;

means, connected to the microprocessor, for generating the menus from the stored information in the menu memory means when prompted by the microprocessor; and means, connected to the microprocessor, for commanding the microprocessor to prompt the menu generation means to generate the menus for display.

7. The system of claim 6, wherein the commanding means comprises a remote control for remotely commanding the microprocessor.

8. A menu-driven television program selection system offering a plurality of television programs for independent selection by a plurality of different subscribers, the system using a program control information signal carrying programming data on television program lineups of the plurality of the television programs, the system also using computer program instructions stored at each of the plurality of subscriber locations to present options on a menu displayed on a television and to receive upstream data signals from each of the subscriber locations at a cable headend, the system comprising:

an operations center for generating the program control information signal and a plurality of television program lineups, wherein a delivery means delivers the plurality of television program lineups and the program control information signal to at least one cable headend for distribution to the plurality of subscriber locations:

at least one of the cable headends having a network controller for receiving and processing the plurality of television program lineups and the program control information signal and for receiving the upstream data signals from the plurality of subscriber locations;

the delivery means including means for further distributing at least one of the plurality of television program lineups and the program control information signal from the cable headend to each of the plurality of subscriber locations; and each of the plurality of subscriber locations having a set top terminal connected to the delivery means for receiving at least one of the plurality of the television program lineups and the program control information signal from the delivery means, wherein each set top terminal comprises:

a means for selecting at least one television program from a plurality of television programs in the received television program lineup from the displayed menus using the program control information signal and the computer program instructions;

a means for generating the upstream data signals using the computer program instructions; and a means for transmitting the upstream data signals to the network controller at the cable headend.

9. The system of claim 8, wherein the selecting means comprises:

an electronic memory for storing the computer program instructions;

a processor, connected to the electronic memory, for sequencing through the computer program instructions and for transforming the program control information signal into the menus to be displayed on the television utilizing the sequenced computer program instructions; and a subscriber interface, connected to the processor, for choosing one of the options from the displayed menus, and wherein the processor effects the sequencing of the computer program instructions according to the options chosen by the subscriber.

10. The system of claim 8, wherein the television programs in the received television program lineup are grouped by program category and wherein the selecting means comprises means for choosing a program category with each category being accessible by choosing it from the displayed menu.

11. The system of claim 8, wherein the displayed menus are multi-leveled and wherein the selecting means comprises a means for sequentially displaying lower or higher menus so that the options chosen from the selecting means may be used to display another menu.

12. The system of claim 8 wherein programs watched information is included in the upstream data signals by the set top terminal and wherein the network controller comprises means for processing the upstream data signals that include the programs watched information.

13. The system of claim 8 wherein interactive communications are provided in the upstream data signals by the set top terminal and wherein the network controller comprises means for processing the upstream data signals that include the interactive communications.

14. A digitally compressed program delivery system to provide subscribers with menu selection of a plurality of television programs using a plurality of analog program signals and a program control information signal transmitted to at least one cable headend for further transmission, each cable headend transmitting to each subscriber a control information stream and programming signals carrying the plurality of the television programs, each of the menus generated and displayed using the control information stream and stored menu templates at each subscriber location, the system comprising:

an operations center including:
  means for digitally compressing the plurality of analog program signals to produce digitally compressed signals; and
  means for creating a plurality of television program lineups with the digitally compressed signals of the programs in the lineups and program control information signal, wherein the program control information signal includes data on the television program lineups and control information for use at the subscriber location;

delivery means for transmitting the plurality of television program lineups and the program control information signal to at least one of the cable headends for processing;

at least one of the cable headends having means for processing the plurality of television program lineups and the program control information signal to produce the control information stream and the programming signals;

the delivery means further includes means for distributing the control information stream and the programming signals to each subscriber location;

means for generating menus using the control information stream and stored menu templates; and subscriber interface means for selection of any one of the plurality of television programs using one or more of the generated and displayed menus.

15. The digitally compressed program delivery system of claim 14 wherein digital program signals are used, and wherein the digitally compressing means comprises means to compress the digital program signals so that the digitally compressed signals are produced from the plurality of analog program signals and the digital program signals.

16. The digitally compressed program delivery system of claim 14 wherein control information is extracted and individual programs are selected from the television program lineups with the digitally compressed signals and the program control information signal, and wherein the processing means further comprises:
  a means for receiving the television program lineups with the digitally compressed signals and the program control information signal;
  a means for demultiplexing the television program lineups with the digitally compressed signals and the program control information signal into the control information and the individual programs;
  a means for selecting some of the individual programs;
  a means for combining the selected individual programs to produce the programming signals; and
  a means for modifying the control information to produce the control information stream.

17. The digitally compressed program delivery system of claim 16 wherein regional programs are transmitted by the delivery means, and wherein the combining means comprises means for adding the regional programs to the selected individual programs to produce the programming signals.

18. The digitally compressed program delivery system of claim 14 wherein analog signals are delivered to each subscriber location, and wherein the distributing means comprises a digital-to-analog conversion means for converting the programming signals to analog signals for distribution to each subscriber location.

19. The digitally compressed program delivery system of claim 14 wherein regional programming information is processed by the processing means, and wherein the processing means comprises a network controller for modifying the program control information signal to include regional programming information, and wherein the modified program control information signal is used to produce the control information stream.

20. A method for offering a plurality of television programs for selection by a subscriber using a program control information signal carrying data on a plurality of television program lineups and using computer program instructions stored at each subscriber location to present options on a menu displayed on a television, the method comprising the steps of:

creating the plurality of television program lineups at an operations center;

generating the program control information signal at the operations center that includes data on the plurality of the television program lineups and control information for use at the subscriber location;

delivering the plurality of the television program lineups and the program control information signal to the subscriber location;

generating menus with the options for display using the computer program instructions; and selecting at least one of the television programs for display on the television using the options on the generated menus.

21. A method for selecting a specific television program from a plurality of television programs to be displayed on a television at a subscriber location, using a display of menu options on the television, the method comprising the steps of:

creating a plurality of television program lineups;

generating programming data which relates to specific television programs in the television program lineups;

transmitting the programming data and the television program lineups to the subscriber location;
receiving the programming data and the television program lineups at the subscriber location;
generating at least one menu option related to at least one specific television program in the received television program lineups using the received programming data; and displaying one or more of the generated menu options on the television;
selecting a displayed menu option;
displaying a specific television program associated with the menu option selected from the received television programs.

* * * * *